US012429056B2

(12) United States Patent
Vallen et al.

(10) Patent No.: US 12,429,056 B2
(45) **Date of Patent: *Sep. 30, 2025**

(54) CUTTING BLADE ASSEMBLY

(71) Applicant: PENTAIR FLOW TECHNOLOGIES, LLC, Delavan, WI (US)

(72) Inventors: Shane Robert Vallen, Copley, OH (US); Douglas Richard Rogers, Perrysville, OH (US)

(73) Assignee: PENTAIR FLOW TECHNOLOGIES, LLC, Delavan, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/322,389

(22) Filed: May 23, 2023

(65) Prior Publication Data

US 2023/0296098 A1 Sep. 21, 2023

Related U.S. Application Data

(63) Continuation of application No. 15/929,999, filed on Jun. 2, 2020, now Pat. No. 11,655,821, which is a (Continued)

(51) Int. Cl.
*F04D 7/04* (2006.01)
*B02C 18/00* (2006.01)
(Continued)

(52) U.S. Cl.
CPC .......... *F04D 7/045* (2013.01); *B02C 18/0092* (2013.01); *B02C 18/06* (2013.01); (Continued)

(58) Field of Classification Search
CPC ...... E03C 1/266; E03C 1/2665; H01F 1/0304; H01F 41/00; H01F 41/02; H01F 41/04; (Continued)

(56) References Cited

U.S. PATENT DOCUMENTS 970,593 A 9/1910 Yeakel
1,148,547 A 8/1915 Smith
(Continued)

FOREIGN PATENT DOCUMENTS

CN 202789688 U 3/2013
DE 1528694 A1 5/1969
(Continued)

OTHER PUBLICATIONS

Zoeller Pump Company, The Shark Series 915 Grinder Pumps, 2013, pp. 1-2.

(Continued)

*Primary Examiner* — Bobby Yeonjin Kim
(74) *Attorney, Agent, or Firm* — Husch Blackwell LLP

(57) ABSTRACT

A cutting blade assembly including a cutting plate, a plurality of cutting slots formed in the cutting plate, and a cutting hub. The cutting plate includes an axial face and a central opening. The plurality of cutting slots are circumferentially spaced about the central opening. Each of the plurality of cutting slots intersects the axial face and defines a respective axial cutting edge at an intersection of each of plurality of cutting slots and the axial face. Each of the plurality of cutting slots defines a base surface that is nonparallel to the axial face. The cutting hub is positioned in the central opening and has a cutting arm adjacent to the axial face.

20 Claims, 26 Drawing Sheets

Related U.S. Application Data continuation of application No. 15/299,279, filed on Oct. 20, 2016, now Pat. No. 10,670,020, which is a continuation of application No. 14/217,043, filed on Mar. 17, 2014, now Pat. No. 9,475,059.

(60) Provisional application No. 61/887,080, filed on Oct. 4, 2013, provisional application No. 61/787,386, filed on Mar. 15, 2013.

(51) Int. Cl.
*B02C 18/06* (2006.01)
*B02C 18/14* (2006.01)
*B02C 18/18* (2006.01)

(52) U.S. Cl.
CPC ............ *B02C 18/062* (2013.01); *B02C 18/18* (2013.01); *B02C 2018/147* (2013.01)

(58) Field of Classification Search
CPC .......... B02C 2018/147; B02C 18/0092; B02C 18/06; B02C 18/062; F04C 2/00; F04D 7/045; F04D 29/2288
USPC ..................................... 241/46, 6; 415/121.1
See application file for complete search history.

(56) References Cited

U.S. PATENT DOCUMENTS 1,713,037 A 5/1929 Ellis
2,014,019 A 9/1935 Girl
2,103,896 A 12/1937 Doyle et al.
2,259,623 A 10/1941 Dieckmann
2,262,039 A 11/1941 Pekor
2,265,758 A 12/1941 Klosson
2,420,420 A 5/1947 Durdin, Jr.
2,496,359 A 2/1950 Rymann
2,672,075 A 3/1954 Fraser
2,852,200 A * 9/1958 Holzer .................. E03C 1/2665 241/257.1
3,073,535 A * 1/1963 Vokes ...................... D21D 1/32 241/257.1
3,096,718 A 7/1963 Anderson
3,128,051 A 4/1964 Smith
3,155,046 A 11/1964 Vaughan
3,155,330 A 11/1964 Holz et al.
3,169,486 A 2/1965 Freed
3,323,650 A 6/1967 Kilbane, Jr.
3,325,107 A 6/1967 Peterson
3,380,669 A * 4/1968 Hatton ..................... D21D 1/30 241/89.4
3,380,673 A 4/1968 Van Lenten et al.
3,444,818 A 5/1969 Sutton
3,447,475 A 6/1969 Blum
3,560,106 A 2/1971 Sahlstrom
3,650,481 A 3/1972 Conery et al.
3,658,262 A 4/1972 Burant, Jr.
3,692,422 A 9/1972 Girardier
3,738,581 A 6/1973 Gallauresi et al.
3,843,063 A 10/1974 Honeyman
3,889,885 A * 6/1975 Couture ................. D21B 1/347 241/46.11
3,915,394 A 10/1975 Ferguson
RE28,677 E 1/1976 Blakley et al.
3,973,866 A 8/1976 Vaughan
4,074,869 A * 2/1978 Johnson ................. A01G 3/002 74/52
4,108,386 A 8/1978 Conery et al.
4,109,872 A 8/1978 Couture
4,141,510 A 2/1979 Smith
4,145,008 A 3/1979 Wolford
4,378,093 A 3/1983 Keener
4,402,648 A 9/1983 Kretschmer
4,456,424 A 6/1984 Araoka
4,480,796 A * 11/1984 Paraskevas ............ D21B 1/347 241/46.11
4,640,666 A 2/1987 Sodergard
4,778,336 A 10/1988 Husain
4,842,479 A 6/1989 Dorsch
4,904,159 A 2/1990 Wickoren
4,911,368 A 3/1990 Nishimori
5,011,370 A 4/1991 Sodergard
5,016,825 A 5/1991 Carpenter
5,076,757 A * 12/1991 Dorsch ................... F04D 7/045 415/110
5,213,469 A 5/1993 Mitsch et al.
5,256,032 A 10/1993 Dorsch
5,265,990 A * 11/1993 Kuban .................. B23B 31/265 409/230
5,346,143 A 9/1994 Askin
5,456,580 A * 10/1995 Dorsch ............... B02C 18/0092 415/121.1
5,460,482 A 10/1995 Dorsch
5,531,385 A 7/1996 Witsken
5,707,016 A * 1/1998 Witsken ................. D21D 1/303 241/261.3
5,906,435 A * 5/1999 Callaghan ........... B01F 35/7173 432/115
5,918,822 A * 7/1999 Sternby .................. D21B 1/347 241/46.11
6,012,662 A * 1/2000 Sullivan ................ E03C 1/2665 241/46.013
6,029,917 A 2/2000 Jensen
6,190,121 B1 * 2/2001 Hayward ................ F04D 7/045 415/206
6,224,331 B1 5/2001 Hayward et al.
D524,827 S 7/2006 Byrne
7,080,797 B2 7/2006 Doering et al.
7,114,925 B2 10/2006 Shaw
7,118,327 B2 10/2006 Doering et al.
7,125,221 B2 10/2006 Dorsch et al.
7,159,806 B1 * 1/2007 Ritsema .................... F04D 3/02 241/89.4
7,168,915 B2 1/2007 Doering et al.
7,234,657 B2 6/2007 Doering et al.
7,237,736 B1 7/2007 Martin
7,455,251 B2 11/2008 Doering et al.
7,461,804 B2 12/2008 Walters
7,520,454 B2 4/2009 Zelder et al.
7,584,916 B2 9/2009 Shaw
7,607,884 B2 10/2009 Cohen
D607,023 S 12/2009 Perkovich et al.
7,811,051 B2 10/2010 Wagner
7,841,550 B1 11/2010 Dorsch et al.
7,841,826 B1 * 11/2010 Phillips ................. E21B 43/128 415/199.3
7,841,827 B2 11/2010 Keener
7,967,553 B2 6/2011 Wagner
8,105,017 B2 1/2012 Dorsch et al.
8,109,714 B2 2/2012 Keener
8,197,192 B2 6/2012 Andersson
8,231,337 B2 7/2012 Andersson
8,267,643 B2 * 9/2012 Wagner ............... F04D 29/2288 415/206
8,366,384 B2 2/2013 Sodergard
8,485,530 B2 7/2013 Johansson et al.
8,500,393 B2 8/2013 Cartwright et al.
8,523,187 B2 9/2013 Eriksson
8,562,287 B2 10/2013 Schmidt et al.
8,608,428 B2 12/2013 Andersson
8,633,623 B2 1/2014 Bingler
8,657,564 B2 2/2014 Cuppetelli
8,764,278 B2 7/2014 Fondelius
8,905,341 B2 12/2014 Dorsch et al.
8,985,490 B2 3/2015 Dorsch et al.
9,004,381 B2 4/2015 Schmidt et al.
9,073,056 B2 7/2015 Abeln
9,352,327 B2 5/2016 Schmidt et al.
9,475,059 B2 * 10/2016 Vallen ..................... B02C 18/18
9,719,515 B2 8/2017 Pohler
10,054,136 B2 8/2018 Sowa et al.
10,267,312 B2 4/2019 Pohler

(56) References Cited

U.S. PATENT DOCUMENTS

| | | | |
|---|---|---|---|
| 10,280,933 B2 | 5/2019 | Sowa et al. | |
| 10,316,846 B2 | 6/2019 | Davis | |
| 2004/0234370 A1 | 11/2004 | Simakaski et al. | |
| 2008/0008577 A1 | 1/2008 | Cohen | |
| 2009/0092479 A1 | 4/2009 | Wagner | |
| 2010/0092276 A1 | 4/2010 | Cartwright et al. | |
| 2010/0322756 A1 | 12/2010 | Schmidt, P.E. et al. | |
| 2013/0108411 A1 | 5/2013 | Ciotola | |
| 2013/0121811 A1 | 5/2013 | Cuppetelli | |
| 2013/0270375 A1 | 10/2013 | Schmidt et al. | |
| 2014/0064929 A1 | 3/2014 | Adams et al. | |
| 2014/0199165 A1* | 7/2014 | Pohler | F04D 1/00 415/204 |
| 2014/0308142 A1 | 10/2014 | Andersson | |
| 2014/0363273 A1 | 12/2014 | Burman | |
| 2014/0377055 A1 | 12/2014 | Garvin et al. | |
| 2015/0377246 A1 | 12/2015 | Tieu et al. | |
| 2016/0208812 A1 | 7/2016 | Sowa et al. | |
| 2016/0363123 A1 | 12/2016 | Davis | |
| 2017/0306965 A1 | 10/2017 | Bevington | |
| 2018/0202453 A1 | 7/2018 | Pohler | |

FOREIGN PATENT DOCUMENTS

| | | | |
|---|---|---|---|
| DE | 3015755 | A1 | 11/1981 |
| DE | 4319616 | A1 | 12/1994 |
| DE | 19834815 | A1 | 2/2000 |
| DE | 102004058458 | B3 | 5/2006 |
| DE | 102008057233 | A1 | 5/2010 |
| EP | 406788 | A2 | 1/1991 |
| EP | 1344944 | A1 | 9/2003 |
| EP | 2147213 | B1 | 1/2016 |
| EP | 3042082 | A1 | 7/2016 |
| EP | 2535589 | A3 | 3/2018 |
| EP | 3309401 | A1 | 4/2018 |
| EP | 3312426 | A1 | 4/2018 |
| EP | 2971520 | | 2/2022 |
| GB | 584395 | A | 1/1947 |
| GB | 1486237 | A | 9/1977 |
| GB | 2128102 | A | 4/1984 |
| GB | 2391266 | A | 2/2004 |
| IT | MI20130608 | A1 | 10/2014 |
| KR | 20070054785 | A | 5/2007 |
| RS | 51594 | B | 8/2011 |
| WO | 2007143853 | A1 | 12/2007 |
| WO | 20140145910 | A1 | 9/2014 |
| WO | 2015032609 | A1 | 3/2015 |
| WO | 2018073136 | A1 | 4/2018 |
| WO | 2018073137 | A1 | 4/2018 |
| WO | 2018100488 | A1 | 6/2018 |

OTHER PUBLICATIONS

Frontline Industries, Inc., Shredder Pump, http:/www.frontlineindustries.com/news-and-media/image-gallery/shredder-pump, Oct. 2014, pp. 1-2.

International Search Report and Written Opinion, International Application No; PCT/US2014/030761, Aug. 20, 2014, 7 pp.

Zoeller Pump Company, The Shark Series 840 Grinder Pumps, 2014, pp. 1-4.

Zoeller Pump Company, The Shark Series 841 & 842 Grinder Pumps, 2014, pp. 1-2.

European Search Report, European Application No. 14765322.4, Jul. 15, 2016, 7 pp.

Jung Pumpen Pentair Water, Commercial Grinder G2dt/g2d Series, May 2011, pp. 1-2.

Liberty Pumps, LSG200-Series Omnivore Grinders, 2011, pp. 1-4.

Extended European Search Report, European Application No. 17790355.6, dated Dec. 20, 2019, 6 pages.

International Search Report and Written Opinion, International Application No. PCT/US2017/029664, mailed Sep. 18, 2017, 12 pages.

Extended European Search Report, European Application No. 19177599.8, dated Nov. 19, 2019, 6 pages.

* cited by examiner

CUTTING BLADE ASSEMBLY

CROSS REFERENCE TO RELATED APPLICATIONS

This application is a continuation of U.S. patent application Ser. No. 15/929,999 that was filed on Jun. 2, 2020, which claims priority to U.S. patent application Ser. No. 15/299,279 that was filed on Oct. 20, 2016, which claims priority to U.S. patent application Ser. No. 14/217,043 that was filed on Mar. 17, 2014, which claims priority to U.S. Provisional Patent Application No. 61/787,386 that was filed on Mar. 15, 2013 and U.S. Provisional Patent Application No. 61/887,080 that was filed on Oct. 4, 2013, all of which are hereby incorporated by reference as if fully set forth herein.

BACKGROUND OF THE INVENTION

Cutting blade assemblies are used in a wide variety of applications to generally reduce the particle size of the medium being processed. Grinder pumps include a motor that rotates an impeller and an associated cutting blade assembly. Fluid and debris suspended within the fluid are drawn into the grinder pump where the cutting blade assembly attempts to reduce the particle size of the suspended debris before the impeller pumps the resulting slurry to a downstream location.

One issue common to most cutting blade assemblies, and especially those incorporated in a grinder pump or other fluid pumping applications, is the efficient processing and jam-free operation of the cutting blade assembly given the wide variety of debris encountered. For instance, with grinder pumps, debris including rags, mop heads, beverage containers, diapers, coins, and other objects can clog and jam the cutting blade assembly or place an increased load on the motor driving the cutting blade assembly. The various types of debris present many challenges because stringy debris (e.g., a mop head) can tend to wrap around the cutting blade assembly, resilient debris (e.g., plastic and rubber objects) can tend to wedge between moving parts of the cutting blade assembly, and hard debris (e.g., metallic objects) can wear or damage the cutting features of the cutting blade assembly.

To address these various problems associated with processing a variety of suspended debris, the drive motor torque can be increased, the cutting blade assembly strengthened, and the allowable particle size increased. However, none of these approaches presents an efficient, cohesive technique to address the persistent issues faced by cutting blade assemblies, and especially those cutting blade assemblies used in grinder pump applications.

SUMMARY OF THE INVENTION

Some embodiments provide a cutting blade assembly including a cutting plate, a plurality of cutting slots formed in the cutting plate, and a cutting hub. The cutting plate includes an axial face and a central opening. The plurality of cutting slots are circumferentially spaced about the central opening. Each of the plurality of cutting slots intersects the axial face and defines a respective axial cutting edge at an intersection of each of plurality of cutting slots and the axial face. Each of the plurality of cutting slots defines a base surface that is nonparallel to the axial face. The cutting hub is positioned in the central opening and has a cutting arm adjacent to the axial face.

In some embodiments, each of the plurality of cutting slots defines a landing portion that is parallel to the axial face. Each of the plurality of cutting slots can establish fluid communication with the central opening. The central opening can define a radial face, and each of the plurality of cutting slots can intersect the radial face. Each of the plurality of cutting slots can be oriented to extend radially outward from the central opening. Each of the plurality of cutting slots can include an undercut portion. Each of the plurality of cutting slots can include an inner portion that is perpendicular to the axial face and adjacent the undercut portion.

Some embodiments provide a cutting plate for a cutting blade assembly. The cutting plate includes an axial face, a central opening in the axial face, a first cutting slot, and a second cutting slot. The first cutting slot has a first axial cutting edge at an intersection of the first cutting slot and the axial face. The first cutting slot defines a landing portion that is parallel to the axial face. The second cutting slot has a second cutting edge. The second cutting slot defines a base surface that is nonparallel to the axial face.

In some embodiments, the base surface is skewed axially inward from the axial face toward the central opening. The second cutting slot can include two parallel sides and a distal edge that is angled relative to the parallel sides of the second cutting slot. The cutting plate can be disk-shaped, the first cutting slot can be oriented to extend radially outward from the central opening, and the first cutting slot can be circumferentially angled with respect to the circumference of the cutting plate. The central opening can have a center point, and the first cutting slot can extend along a ray extending from the center point. The second cutting slot can be oriented to extend radially outward from the central opening and can be skewed relative to the ray. The first cutting slot can define a second base surface that is nonparallel to the axial face. The landing portion can be adjacent the central opening.

Some embodiments provide a cutting plate for a cutting blade assembly. The cutting plate includes an axial face, a central opening in the axial face, a first cutting slot, and a second cutting slot. The first cutting slot has a first axial cutting edge at an intersection of the first cutting slot and the axial face. The first cutting slot defines a landing portion that is parallel to the axial face. The second cutting slot has a second cutting edge. The second cutting slot defines a pocket in the axial face of the cutting plate.

In some embodiments, second cutting slot includes a skewed base surface. The base surface can be skewed axially inward from the axial face toward the central opening. The cutting plate can include a plurality of the first cutting slots circumferentially spaced about the central opening. The cutting plate can include a plurality of the second cutting slots circumferentially spaced about the central opening.

DETAILED DESCRIPTION

Figure 1:
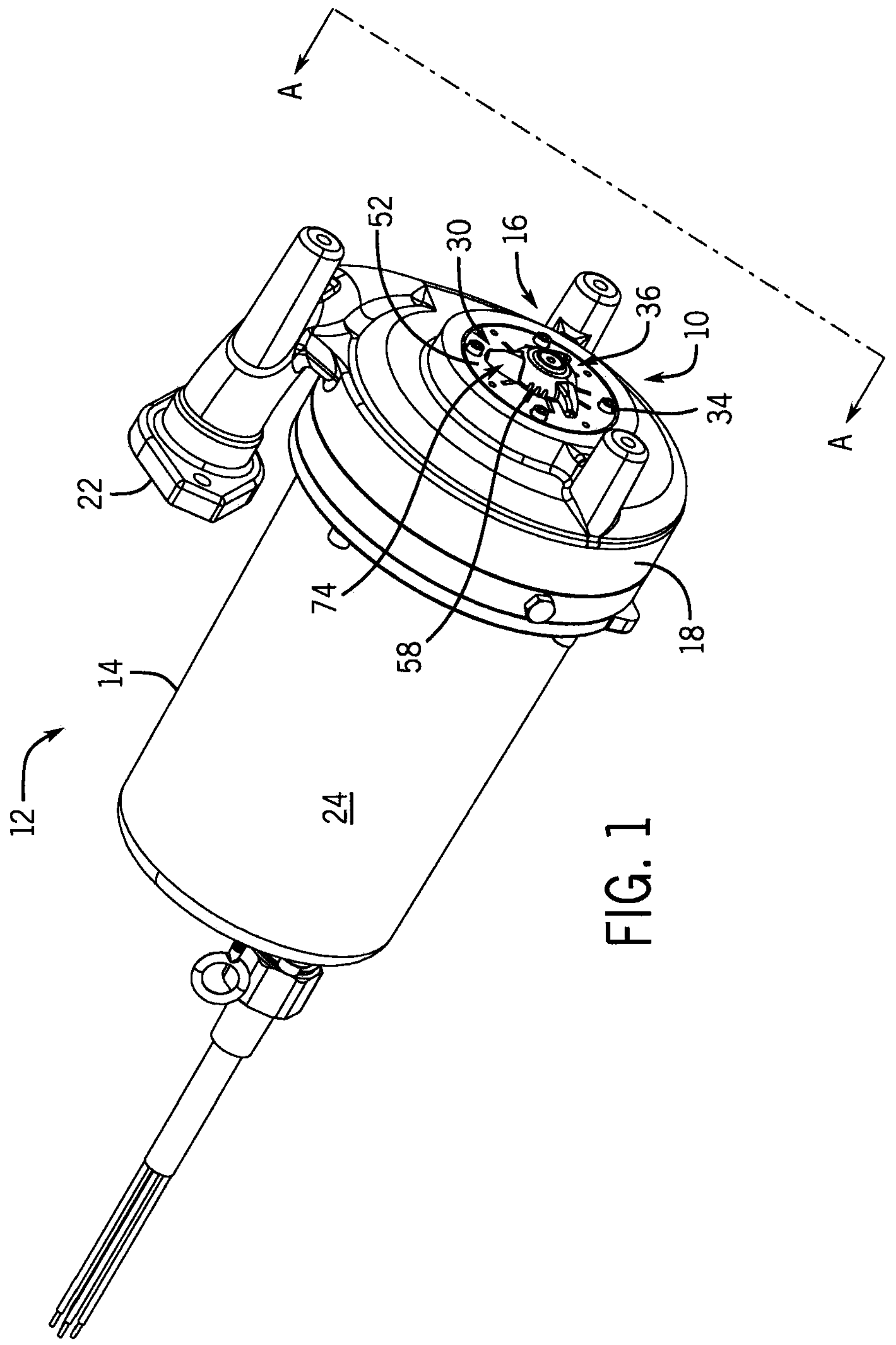
FIG. 1 is an isometric view of a cutting blade assembly according to one embodiment of the invention for a grinder pump.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

One embodiment of a cutting blade assembly 10 is described in the context of a grinder pump 12. However, the embodiments described herein can be incorporated into other suitable types of cutting devices, such as blenders, mixers, and food processors.

Figure 2:
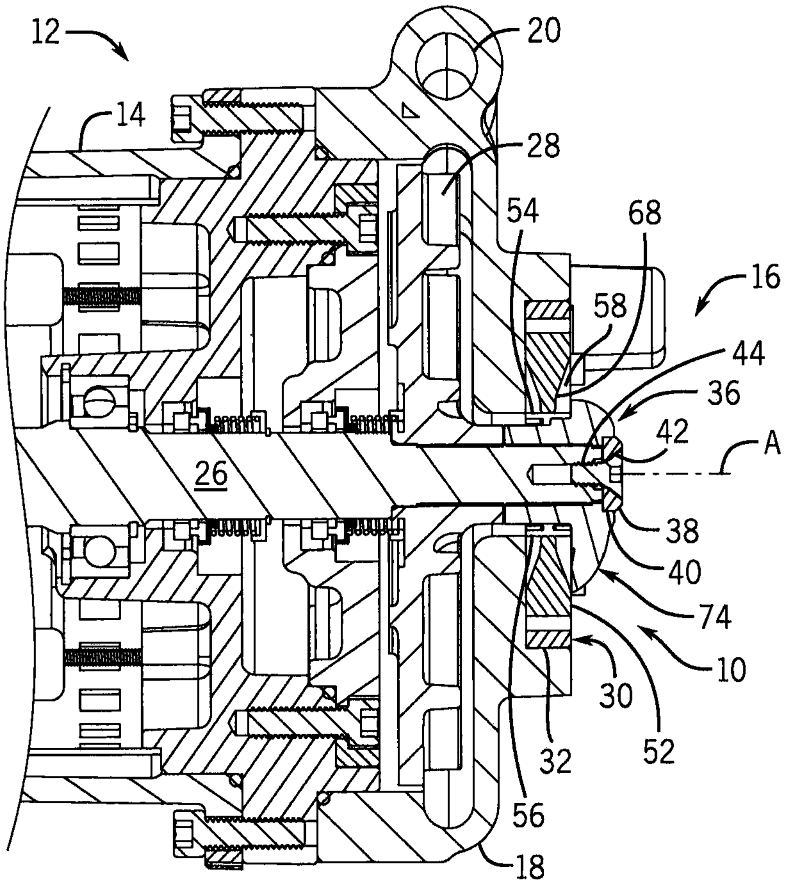
FIG. 2 is a partial section view along line A-A of FIG. 1.
Figure 3:
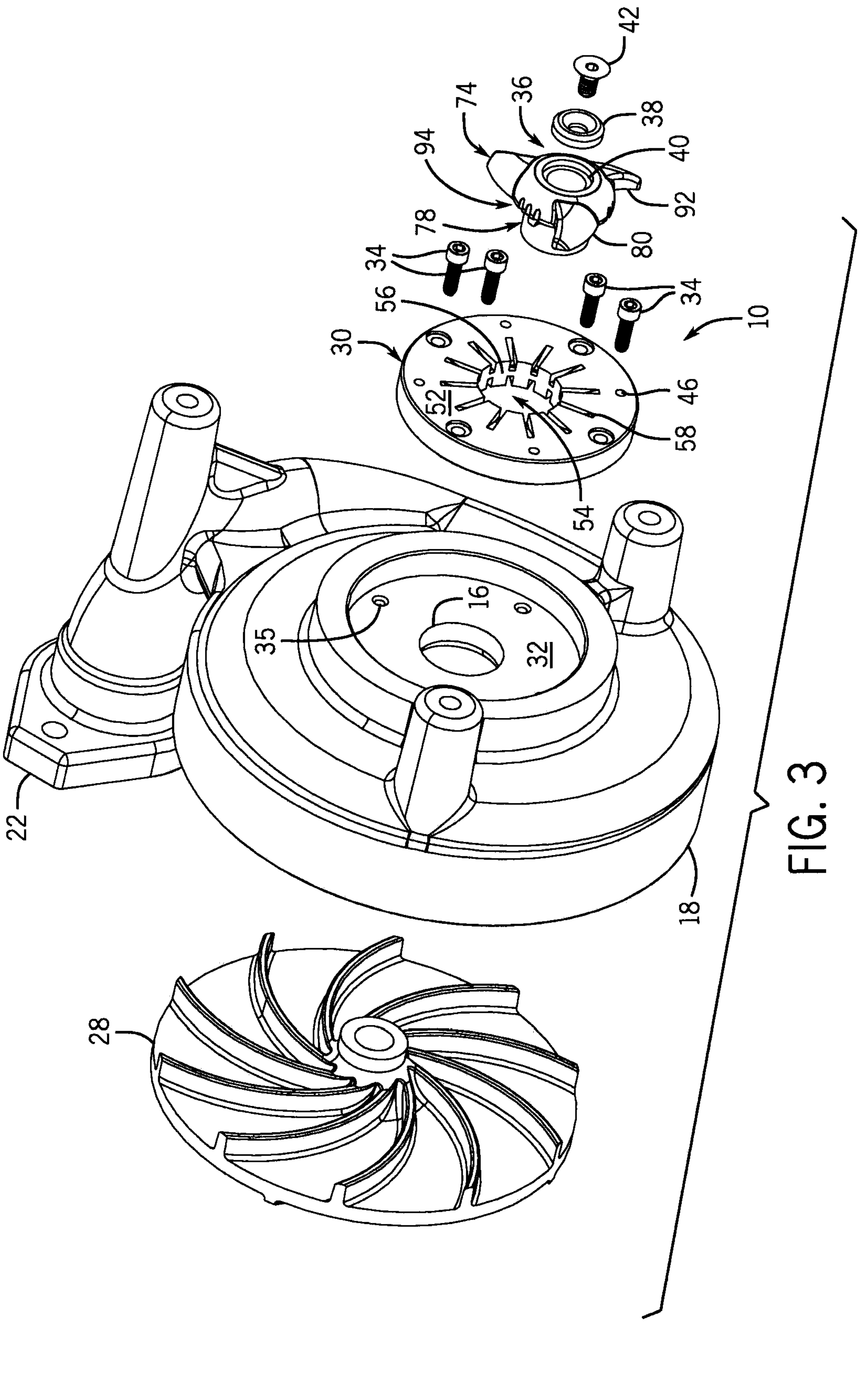
FIG. 3 is an exploded isometric view of the cutting blade assembly and a portion of the grinder pump of FIG. 1.

FIGS. 1-3 illustrate a grinder pump 12 including the cutting blade assembly 10 and a fluid pump 14. The grinder pump 12 generally draws fluid and debris adjacent to an inlet 16 formed in a pump housing 18. The fluid and debris are processed by the cutting blade assembly 10 and the resulting slurry is directed through an internal manifold 20 (as shown in FIG. 2) toward an outlet 22 (as shown in FIGS. 1 and 3). Specifically, the fluid pump 14 includes an electric motor 24 configured to rotate a central drive shaft 26 about a drive axis A. The drive shaft 26 is rotatably fixed to an impeller 28, which is seated within the pump housing 18. As the impeller 28 rotates, fluid and debris are drawn toward the inlet 16 and engaged by the cutting blade assembly 10.

The cutting blade assembly 10 of one embodiment of the invention includes a disk-shaped cutting plate 30 that is seated into a mating cylindrical recess 32 formed in the pump housing 18. The cutting plate 30 is rotatably fixed to the recess 32 by a series of bolts 34 that are engaged with mating threaded holes 35 formed in the recess 32. The cutting blade assembly 10 further includes a cutting hub 36 that is rotatably coupled to the drive shaft 26 of the motor 24, so that the cutting hub 36 rotates in unison with the impeller 28. The cutting hub 36 is threaded onto the end of the drive shaft 26 and is further secured to the drive shaft 26 with a retaining ring 38, which is seated in a recess 40 of the cutting hub 36 and retained by a screw 42 engaged with a threaded bore 44 (shown in FIG. 2) in the end of the drive shaft 26. To aid disassembly of the cutting plate 30 from the recess 32, the cutting plate 30 includes several threaded bores 46 that are circumferentially spaced about the cutting plate 30. Driving the bolts 34 into the threaded bores 46 will result in a tip of each bolt extending through the cutting plate 30 and engaging the recess 32, urging the cutting plate 30 away from the recess 32.

FIGS. 4-12 illustrate the structure of and interaction between the cutting plate 30 and the cutting hub 36 of the cutting blade assembly 10. The cutting plate 30 and the cutting hub 36 are configured to establish both an axial cutting action (i.e., generally parallel to the drive axis A) and a radial cutting action (i.e., generally perpendicular to a direction that is parallel with the drive axis A). The axial cutting action and the radial cutting action are achieved via relative rotation between the cutting plate 30 and the cutting hub 36.

Figure 4:
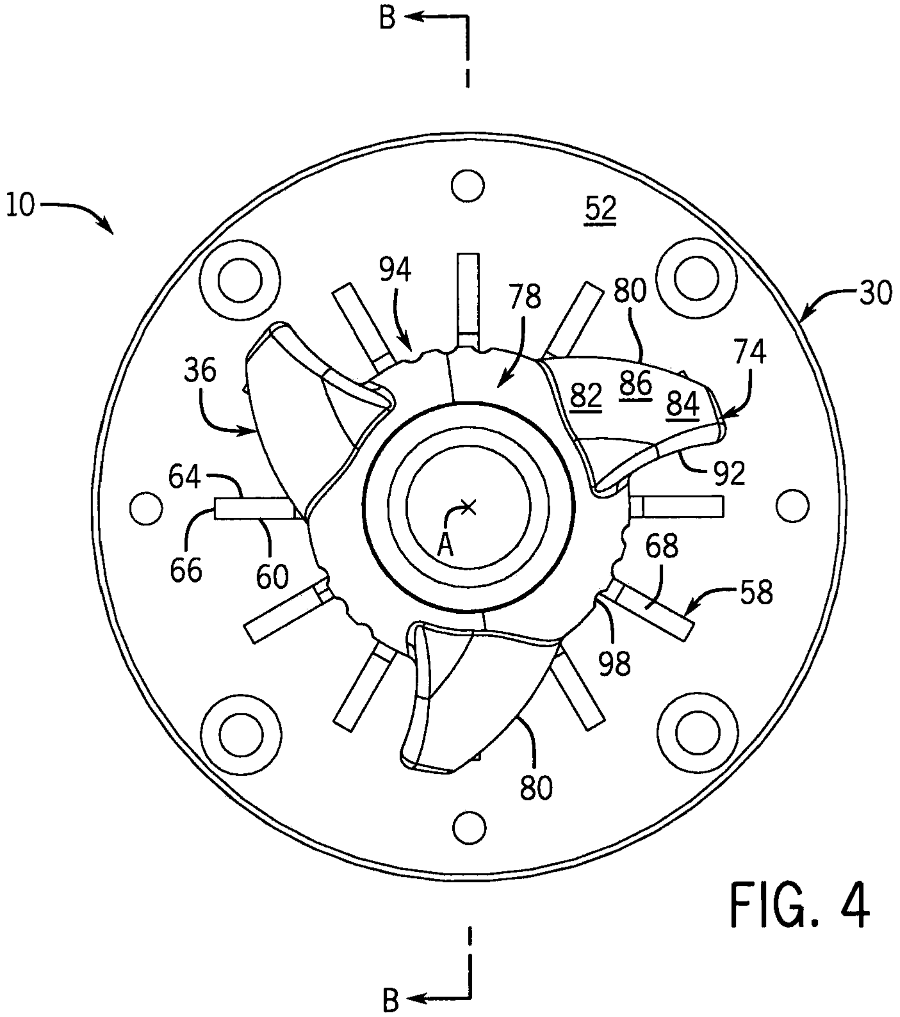
FIG. 4 is a front plan view of the cutting blade assembly of FIG. 1.
Figure 7:
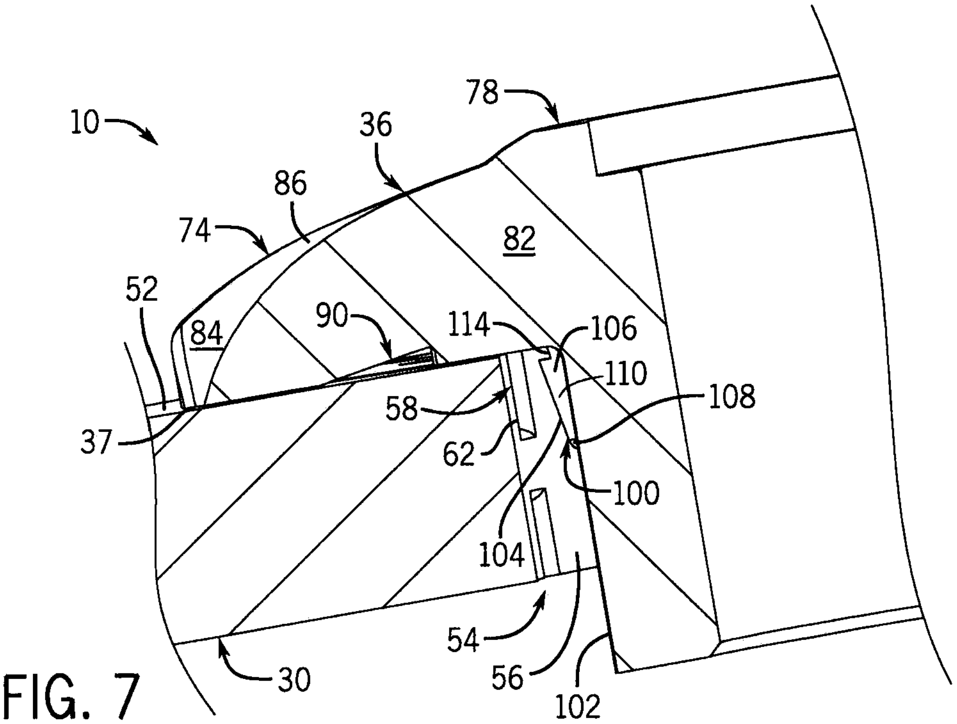
FIG. 7 is a partial detailed cross-sectional view along line B-B of FIG. 4.
Figure 8:
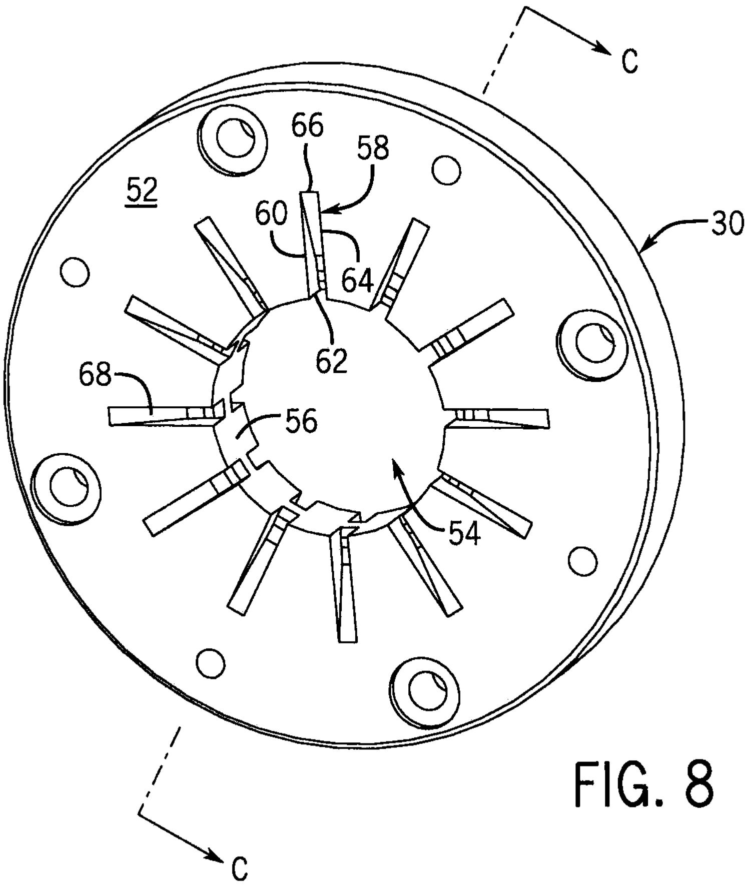
FIG. 8 is an isometric view of a cutting plate of the cutting blade assembly of FIG. 1.
Figure 9:
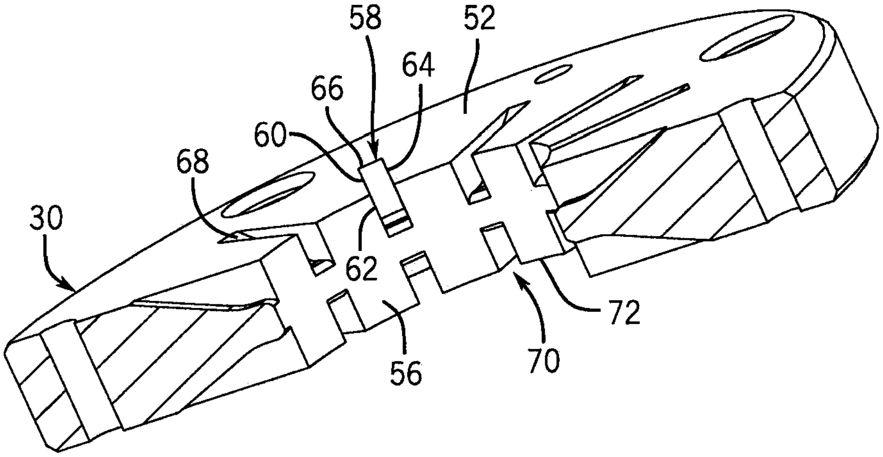
FIG. 9 is a cross section along line C-C of FIG. 8.

As shown in FIGS. 3 and 4, the cutting plate 30 is generally disk-shaped and has a circular axial face 52 and an opening 54 through the cutting plate 30. The opening 54 defines a cylindrical radial face 56 that is perpendicular (or alternatively skewed relative) to the axial face 52. A plurality of cutting slots 58 are formed in the cutting plate 30 and extend through both the axial face 52 and the radial face 56. Each cutting slot 58 defines an axial cutting edge 60 at the intersection of the cutting slot 58 and the axial face 52, and defines a radial cutting edge 62 (as shown in FIG. 7) at the intersection of the cutting slot 58 and the radial face 56. The cutting slot 58 is a rectangular slot through the axial face 52 that defines the axial cutting edge 60, an opposite back edge 64 (as shown in FIG. 8), and a radially outer edge 66 connecting the axial cutting edge 60 and the back edge 64. As shown in FIGS. 8 and 9, the cutting slot 58 includes a base surface 68 that is skewed axially inward from the axial face 52 in the direction of the opening 54 through the cutting plate 30. The contoured base surface 68 is flush with the axial face 52 at the radially outer edge 66 of the cutting slot 58 and is angled toward a central plane of the cutting plate 30 near the radial cutting edge 62. The increasing depth and flow area of the cutting slot 58 (relative to the axial face 52) helps direct axially cut slurry toward the radial cutting edge 62, where the radial cutting action is performed to further reduce the particle size of the axially cut slurry.

The cutting plate 30 includes multiple cutting slots 58 that are identical in shape, that are perpendicular to the drive axis A and opening 54, and that are circumferentially spaced about the drive axis A in a regular pattern. In other embodiments, the shape, number, and relative orientation of the cutting slots 58 may be altered to accommodate application-specific requirements. Furthermore, as shown in FIG. 9, the cutting plate 30 incorporates a mirrored set of cutting slots 70 that extend through another axial face 72 that is parallel and opposite to the axial face 52, so that the cutting plate 30 may be flipped should the axial cutting edges 60 and/or the radial cutting edges 62 become dull, damaged, or otherwise degraded.

Figure 5:
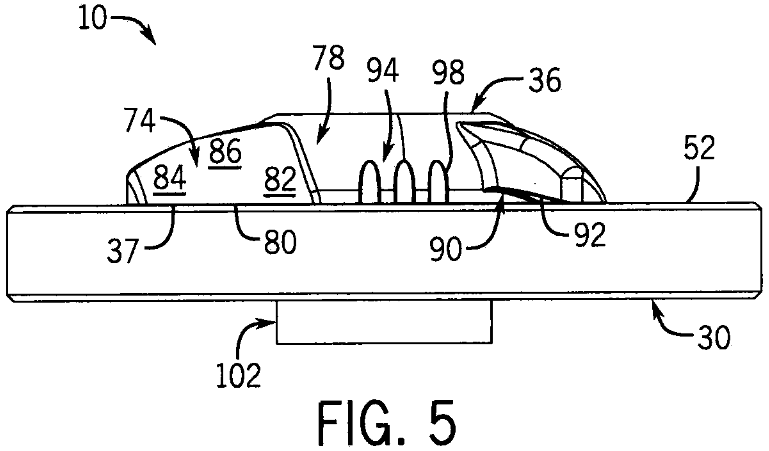
FIG. 5 is a side plan view of the cutting blade assembly of FIG. 1.

As shown in FIG. 3, the axial cutting action is generally accomplished as axial cutting arms 74 of the cutting hub 36 rotate adjacent to the axial cutting edges 60 in a scissor-type, shearing action. The scissor-type action establishes a zone of cutting engagement that progresses radially outward as the cutting hub 36 rotates relative to the cutting plate 30. Specifically, the cutting hub 36 includes three circumferentially spaced axial cutting arms 74 that extend radially outward from a central, cylindrical hub portion 78. Each of the axial cutting arms 74 of the cutting hub 36 has a leading edge 80 that is positioned adjacent to the axial face 52 of the cutting plate 30. As the cutting hub 36 rotates, the leading edges 80 of each axial cutting arm 74 shear past the fixed axial cutting edges 60 of the cutting plate 30 (see FIGS. 4, 5, and 7). As shown in FIG. 5, the gap or spacing 37 between the leading edge 80 and the axial face 52 can be adjusted based on the particular application requirements, such as desired axial cut size and medium being processed.

Figure 11:
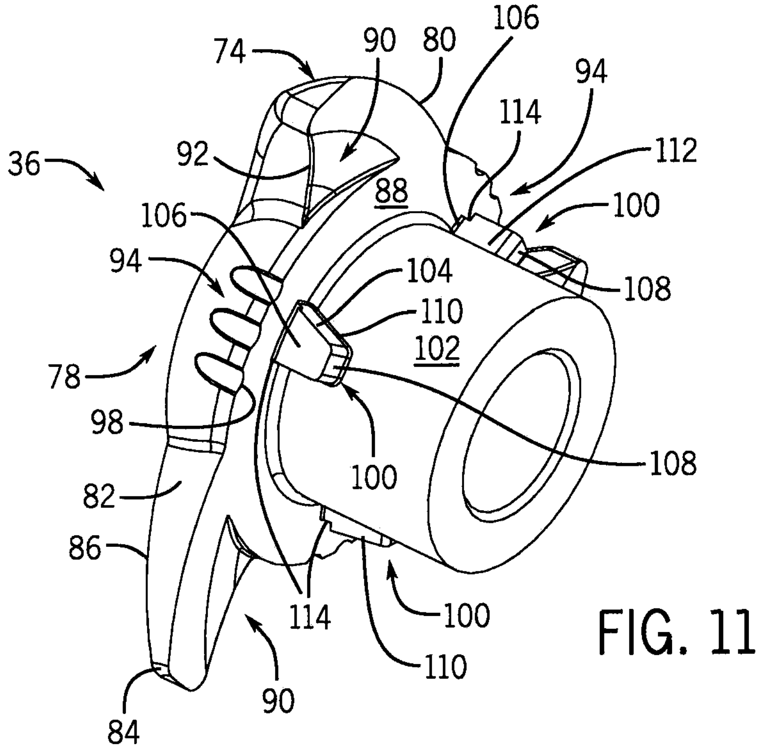
FIG. 11 is a rear view of the cutting hub of FIG. 10.
Figure 12:
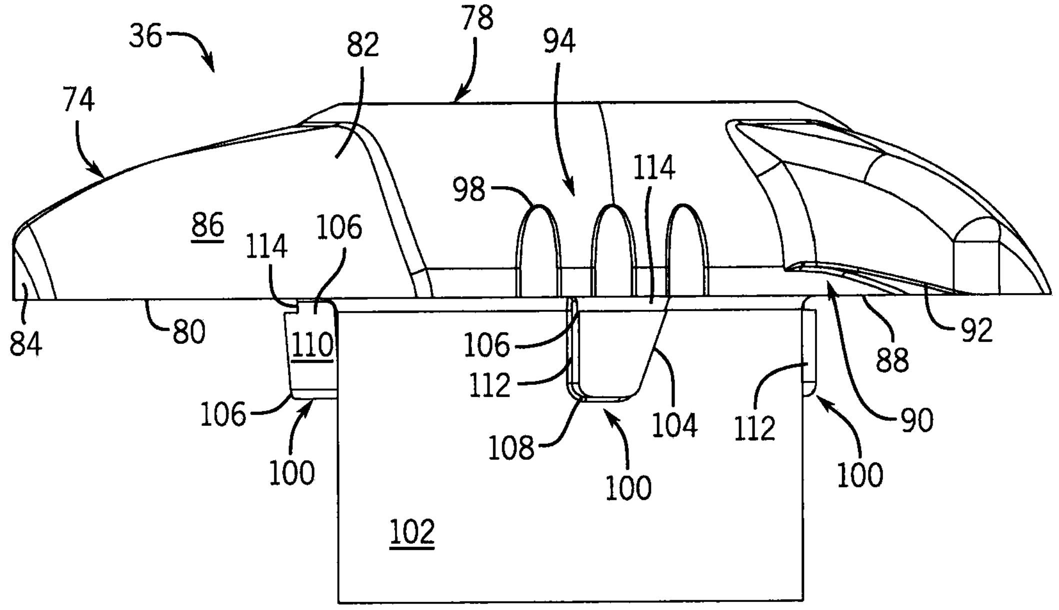
FIG. 12 is a side plan view of the cutting hub of FIG. 10.
Figure 13:
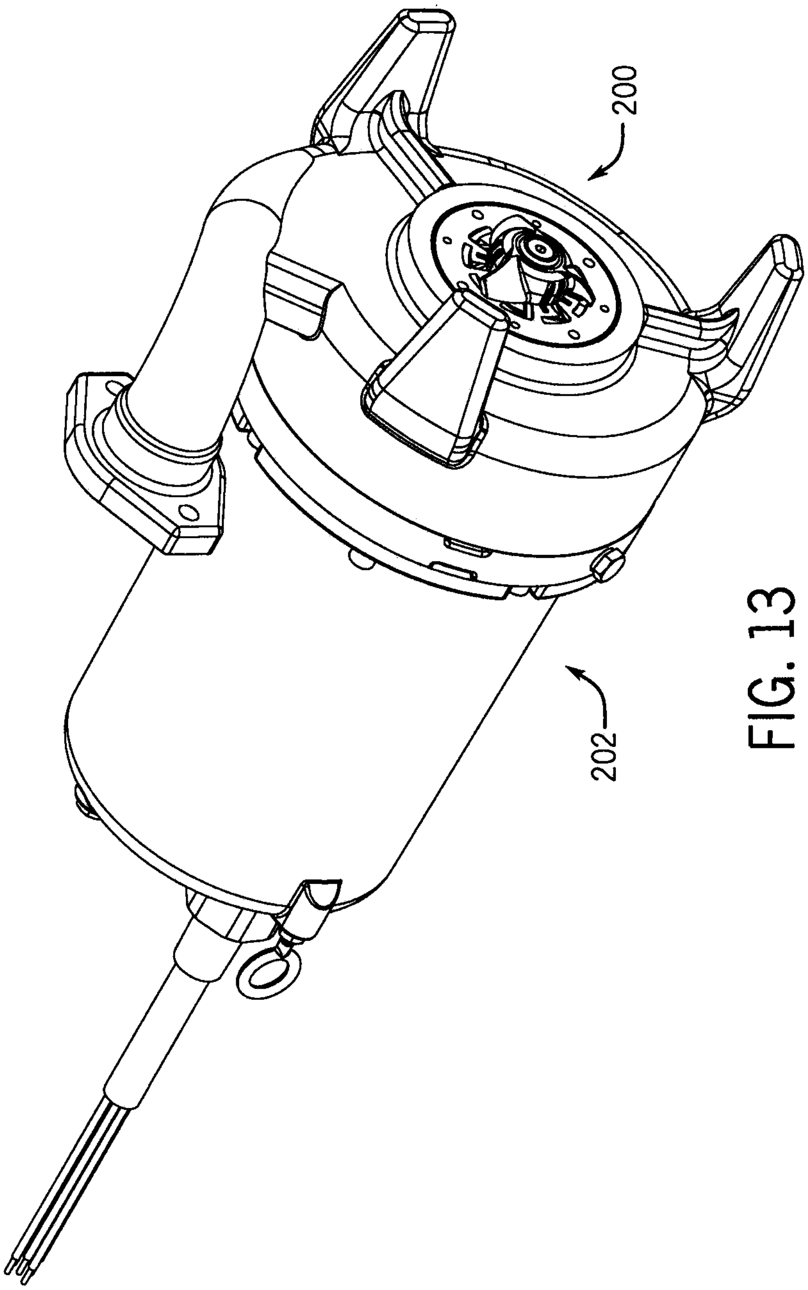
FIG. 13 is an isometric view of a cutting blade assembly according to a second embodiment of the invention for a grinder pump.

As shown in FIGS. 3-5, each of the axial cutting arms 74 is substantially fin shaped and tapers from a wider and thicker base portion 82 adjacent the hub portion 78 to a narrower and thinner tip portion 84 at a distal end of the axial cutting arm 74. As shown in FIG. 4, the axial cutting arm 74 has a generally arcuate front surface 86 and a generally planar rear surface 88. The front surface 86 is rounded to aid in rejecting suspended debris that has not been sufficiently reduced in size by the axial cutting action. As shown in FIG. 3, the hub portion 78 is also dome-shaped to further aid in the rejection of undesirable debris being processed by the axial cutting action. As shown in FIG. 11, an undercut 90 is formed in the rear surface 88 to create a low pressure zone on the back edge 92 of the axial cutting arm 74 to help prevent debris being trapped or becoming stagnant as the axial cutting arm 74 rotates. The arcuate front surface 86 of the cutting arms 74 and the dome-shape of the hub portion 78 also minimize the magnitude of a torque spike of the motor 24 when debris comes into abrupt contact with the cutting hub 36.

Figure 10:
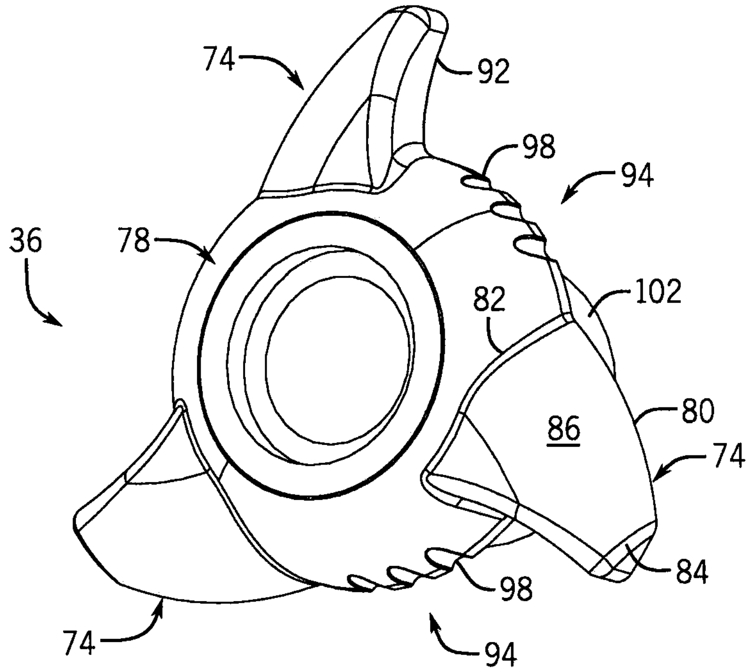
FIG. 10 is a front view of a cutting hub of the cutting blade assembly of FIG. 1.

As shown in FIGS. 10 and 11, a series of serrations 94 are formed on the hub portion 78 between adjacent axial cutting arms 74. The serrations 94 are incorporated to cut debris and prevent debris from becoming entangled with the cutting hub 36. The serrations 94 extend from a midway point on the hub portion 78 and intersect the rear surface 88 of the cutting hub 36, so that the perimeter cutting edges 98 are both adjacent to the axial face 52 and spaced further from the axial face 52 to engage larger debris with an additional cutting action. The shape, number, and placement of the serrations 94 may be adapted to meet a variety of particular application requirements.

Figure 6:
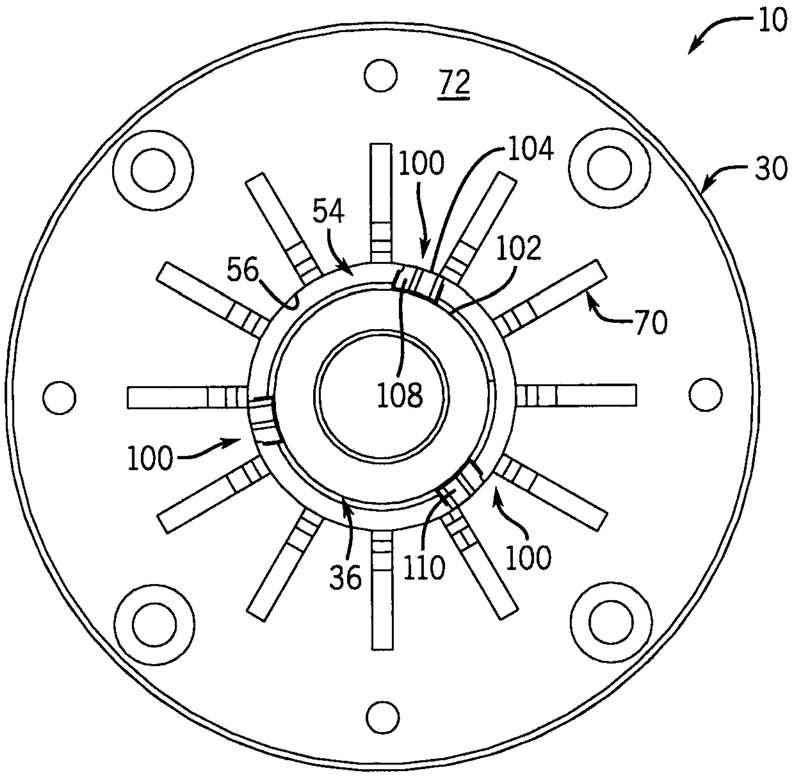
FIG. 6 is a rear plan view of the cutting blade assembly of FIG. 1.

Once the axial cutting action has occurred, the slurry continues downstream where it is subjected to the radial cutting action. Specifically, the radial cutting action occurs as radial cutting arms 100 of the cutting hub 36 sweep past the radial cutting edge 62 of the cutting plate 30 (as shown in FIGS. 6 and 7). The cutting hub 36 includes several radial cutting arms 100 that are positioned adjacent to the radial face 56 as the cutting hub 36 rotates relative to the cutting plate 30. The radial cutting arms 100 are circumferentially spaced about a cylindrical surface 102 that is orthogonal to the rear surface 88 of the hub portion 78. Each radial cutting arm 100 has a leading edge 104 that is positioned adjacent to the radial face 56 of the cutting plate 30. As shown in FIGS. 6 and 7, as the cutting hub 36 rotates, the leading edge 104 of each radial cutting arm 100 shears past the fixed radial cutting edges 62 of the cutting plate 30 effecting the radial scissor-type cutting action. As shown in FIG. 7, each of the radial cutting arms 100 extends from a base 106 adjacent to and extending from the rear surface 88 to a tip 108 that is circumferentially narrower than the base 106. A channel 114 is defined in the base 106 of each radial cutting arm 100 adjacent to the rear surface 88. A leading surface 110 of the radial cutting arm 100 is skewed relative to the rear surface 88, and a trailing surface 112 (as shown in FIG. 11) is orthogonal to the rear surface 88. The skewed leading surface 110 reduces the required driving torque and also efficiently directs the resulting slurry, which has undergone both the axial and radial cutting action, toward the impeller 28. The shape, placement, orientation, and number of radial cutting arms 100 may be altered to accommodate specific application requirements.

Once the radial cutting action is complete, the resulting slurry is urged by the rotating impeller 28 through the internal manifold 20 and ultimately to the outlet 22. The illustrated construction of the cutting plate 30 and the cutting hub 36 (as shown in FIG. 2) provides a generally constant inlet area that improves the efficiency of the overall cutting blade application. For instance, the cross sectional area of the opening 54 in the cutting plate 30 is generally constant over the axial length of the opening 54. The relatively constant inlet area minimizes the velocity changes of the fluid/slurry as it travels through the cutting blade assembly 10 and associated pump components. In the cutting blade assembly 10, the fluid speed is increased as it passes into and through the cutting slots 58, reduces slightly downstream of the cutting slots 58, and maintains approximately the same velocity before reaching the impeller 28. The torque required to operate the cutting blade assembly 10 is further minimized by the swept back configuration of the axial cutting arms 74 and the radial cutting arms 100. Furthermore, the scissor-type cutting employed in both the axial and radial cutting actions reduces the torque requirements as compared to a straight cutting action. The reduction in typical cut size also reduces the torque required (e.g., the example axial and radial cutting action results in a particle size not to exceed ⅛ inch by ⅛ inch).

In one embodiment, the cutting plate 30 and the cutting hub 36 may be investment cast from 440C stainless steel and subsequently hardened to 58-61 Rc. A variety of materials, including metals, plastics, and composites may be used to construct the cutting blade assembly given the specific application requirements.

A second embodiment of a cutting blade assembly 200 incorporating a multifaceted cutting configuration is described with reference to FIGS. 13-21. The cutting blade assembly 200 and associated grinder pump 202 are similar to the cutting blade assembly 10 and grinder pump 12 described above, but focuses on axial cutting. Therefore, the description of the cutting blade assembly 200 will generally discuss the main differences from the cutting blade assembly 10.

FIGS. 15-21 illustrate the structure of and interaction between a cutting plate 204 and a cutting hub 206 of the cutting blade assembly 200. The cutting plate 204 and the cutting hub 206 are configured to primarily establish an axial cutting action during relative rotation between the cutting plate 204 and the cutting hub 206.

Figure 14:
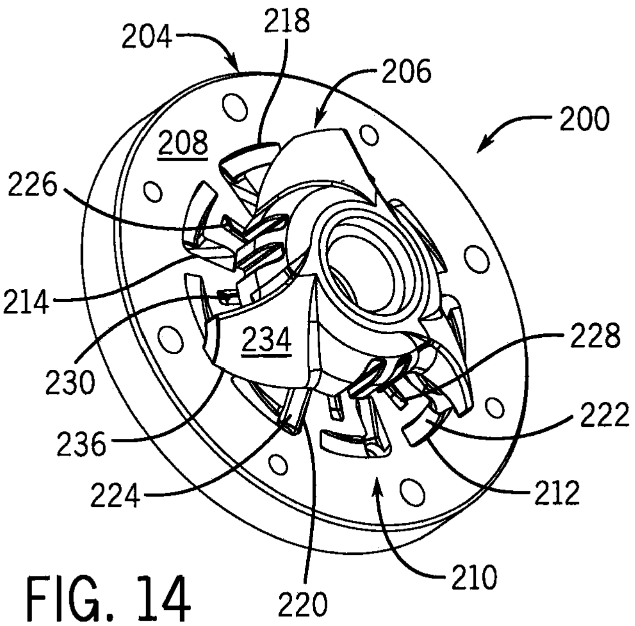
FIG. 14 is an isometric view of the cutting blade assembly of FIG. 13.
Figure 15:
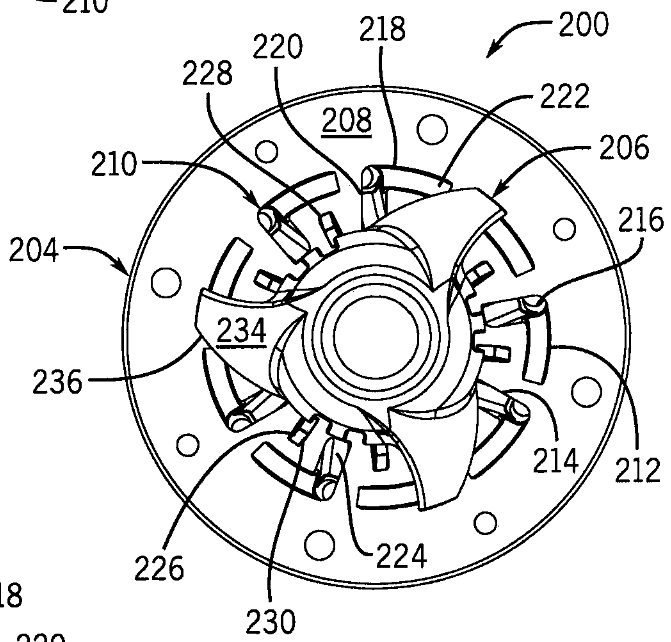
FIG. 15 is a front view of the cutting blade assembly of FIG. 13.
Figure 16:
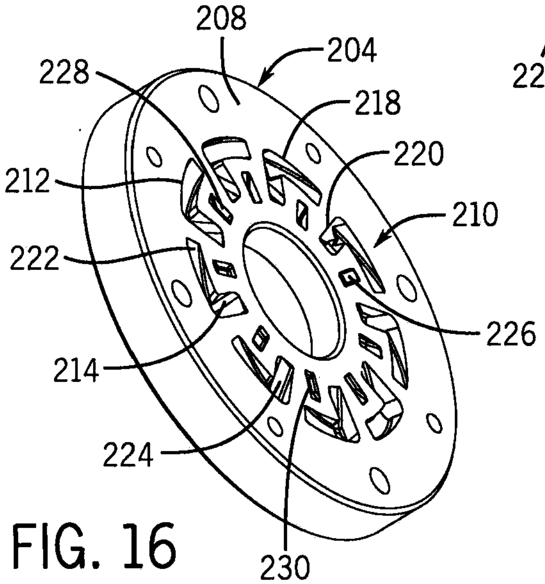
FIG. 16 is an isometric view of a cutting plate of the cutting blade assembly of FIG. 13.
Figure 17:
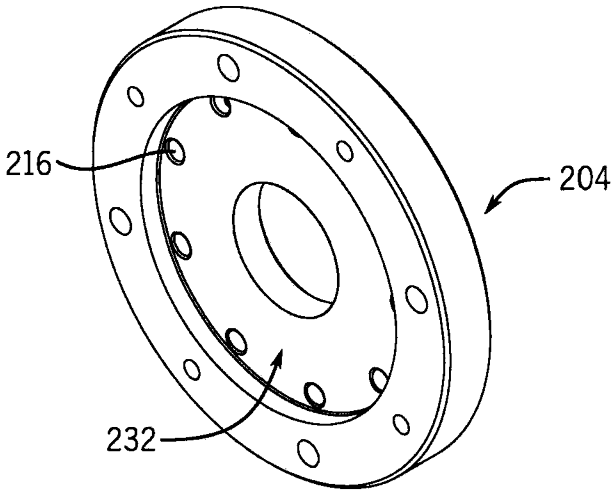
FIG. 17 is another isometric view of the cutting plate of FIG. 16.
Figure 18:
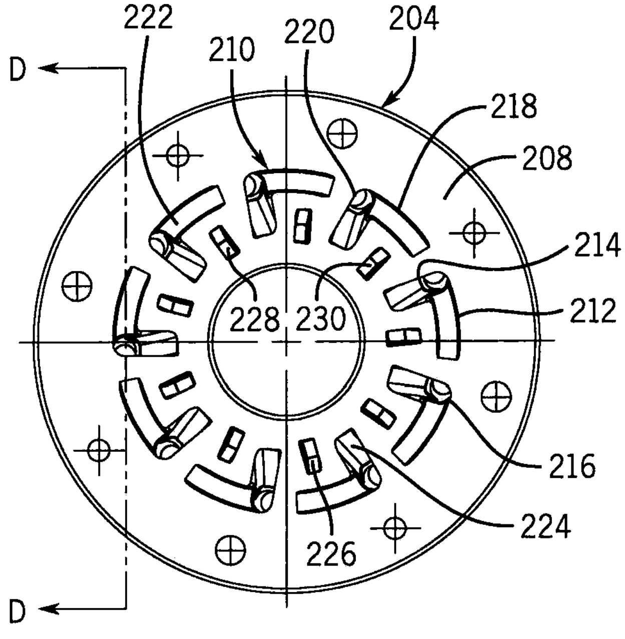
FIG. 18 is a front view of the cutting plate of FIG. 16.
Figure 19:
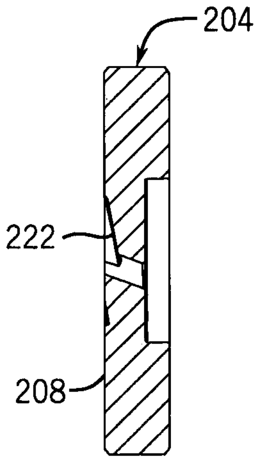
FIG. 19 is a cross section along line D-D of FIG. 18.
Figure 20:
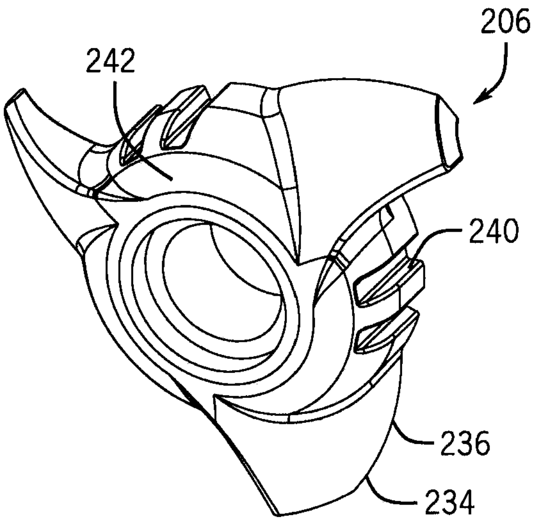
FIG. 20 is an isometric view of a cutting hub of the cutting blade assembly of FIG. 13.
Figure 21:
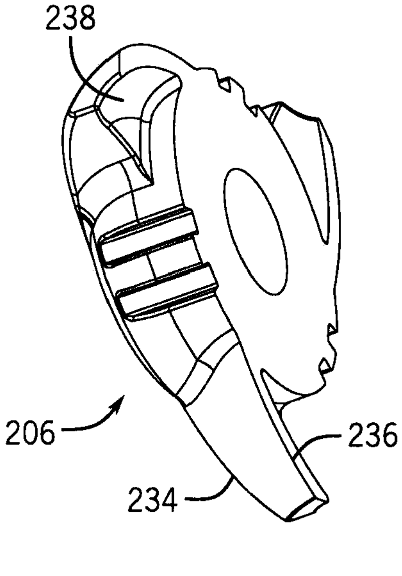
FIG. 21 is another isometric view of the cutting hub of FIG. 20.
Figure 22:
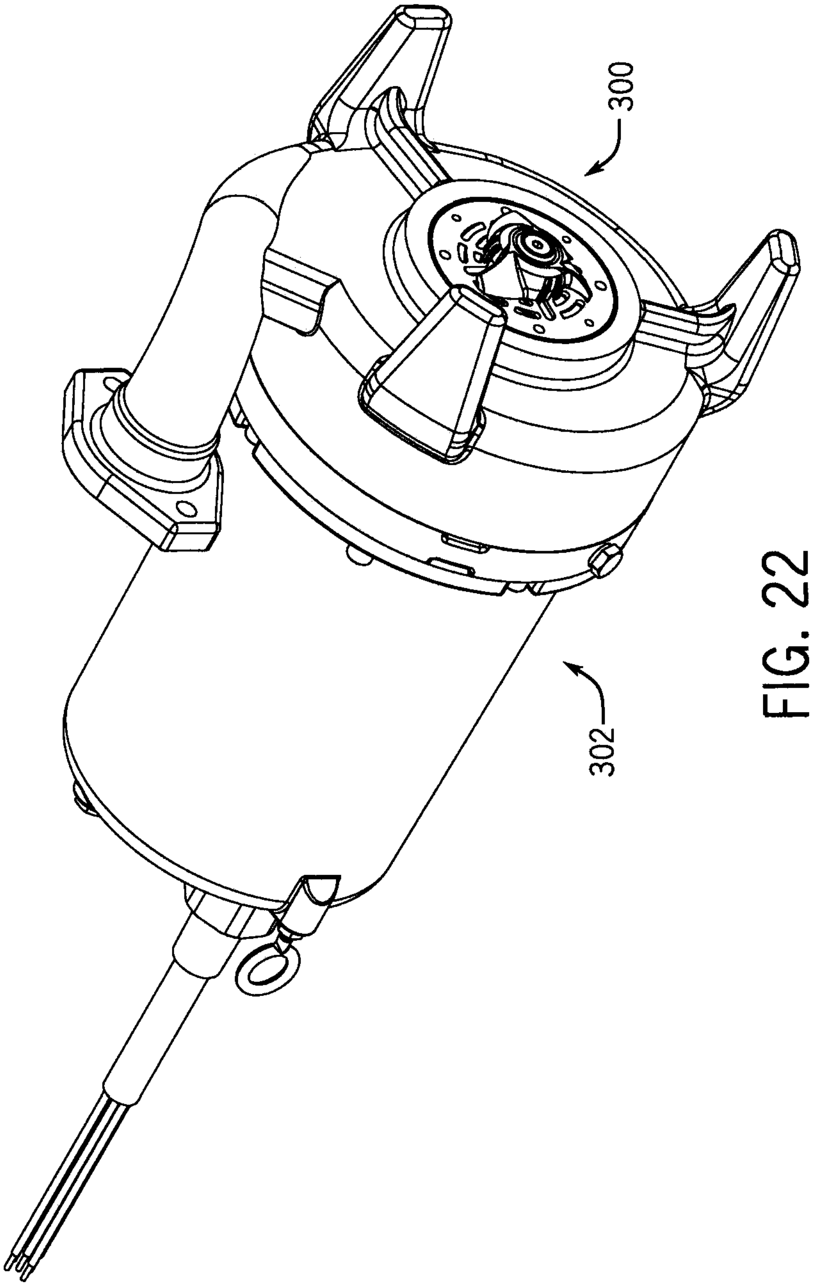
FIG. 22 is an isometric view of a cutting blade assembly according to a third embodiment of the invention for a grinder pump.
Figure 23:
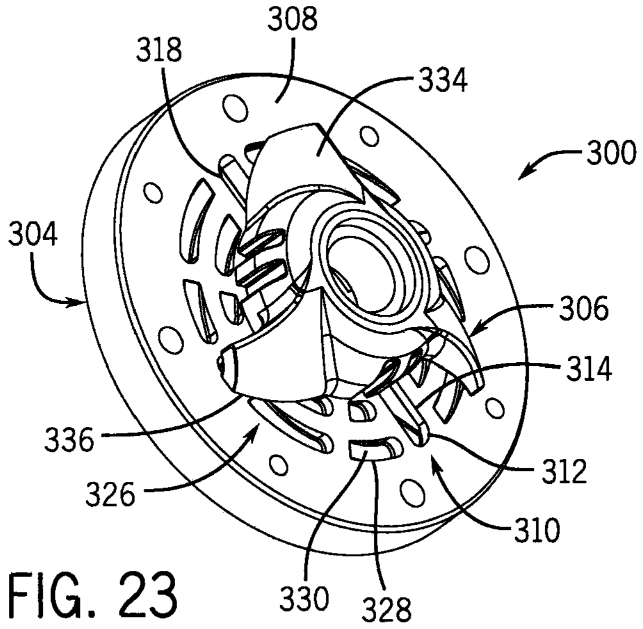
FIG. 23 is an isometric view of the cutting blade assembly of FIG. 22.

As shown in FIGS. 14-18, the cutting plate 204 is generally disk-shaped and has a circular axial face 208. A plurality of cutting slots 210 are formed in the cutting plate 204. Each cutting slot 210 includes an arcuate circumferential portion 212 and a radial portion 214 that converge at a circular opening 216 that extends through the cutting plate 204. FIG. 17 illustrates the backside of the cutting plate 204 defining a recess 232. The openings 216 extend through the cutting plate 204 and terminate at the recess 232, thereby allowing the slurry within the cutting slot 210 to exit into the recess 232. The circumferential portion 212 defines a first axial cutting edge 218 and the radial portion 214 defines a second axial cutting edge 220 the intersection of the cutting slot 210 and the axial face 208. The circumferential portion 212 of the cutting slot 210 includes a first base surface 222 that is skewed axially inward from the axial face 208. Similarly, the radial portion 214 of the cutting slot 210 includes a second base surface 224 that is also skewed axially inward from the axial face 208. The skewed first base surface 222 and second base surface 224 help direct the slurry toward and through the openings 216, reducing the tendency of the slurry to clog. The radial portion 214 is also circumferentially angled or undercut (as shown in FIGS. 15, 18, and 19) to help maintain a sharp second axial cutting edge 220, even as the radial portion 214 wears during use. A series of radially inward slots 226 are also formed in the axial face 208. These inward slots 226 are circumferentially spaced and each defines a slot cutting edge 228 that is formed by a circumferentially skewed pocket 230, similar to the radial portion 214 of the cutting slots 210. In other embodiments, the shape, number, and relative orientation of the cutting slots 210 and inward slots 226 may be altered to accommodate application-specific requirements.

As shown in FIGS. 14 and 15, the axial cutting action is generally accomplished as axial cutting arms 234 of the cutting hub 206 rotate adjacent to the first axial cutting edge 218, the second axial cutting edge 220, and the slot cutting edge 228 in a scissor-type, shearing action. Specifically, the cutting hub 206 includes three circumferentially spaced axial cutting arms 234. Each of the axial cutting arms 234 of the cutting hub 206 has a leading edge 236 that is positioned adjacent to the axial face 208 of the cutting plate 204. As the cutting hub 206 rotates, the leading edges 236 of each axial cutting arm 234 shear past the first axial cutting edge 218, the second axial cutting edge 220, and the slot cutting edge 228 in a scissor-type fashion.

As shown in FIGS. 14, 15, 20, and 21 the cutting hub 206 includes a pocket or undercut 238 that is larger than the undercut 90 of the first example cutting hub 36. In addition, a pair of deeper serrations 240 are formed in a dome-shaped hub portion 242, in contrast to the three shallower serrations 94 of the first example cutting hub 36. The shape, number, and placement of the undercut 238 and serrations 240 may be adapted to meet a variety of particular application requirements.

A third embodiment of a cutting blade assembly 300 having a multifaceted configuration is described with reference to FIGS. 22-31. The cutting blade assembly 300 and associated grinder pump 302 are similar to the cutting blade assembly 10 and grinder pump 12 described above, but emphasize axial cutting. Therefore, the description of the cutting blade assembly 300 will highlight the main differences from the preceding cutting blade assemblies 10, 200.

FIGS. 23-31 illustrate the structure of and interaction between a cutting plate 304 and a cutting hub 306 of the cutting blade assembly 300. The cutting plate 304 and the cutting hub 306 are configured to primarily establish an axial cutting action during relative rotation between the cutting plate 304 and the cutting hub 306.

Figure 24:
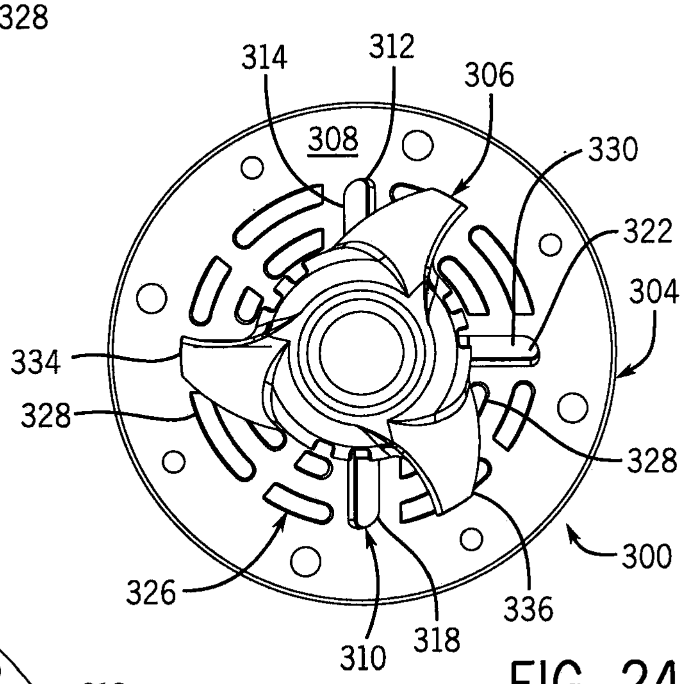
FIG. 24 is a front view of the cutting blade assembly of FIG. 22.
Figure 27:
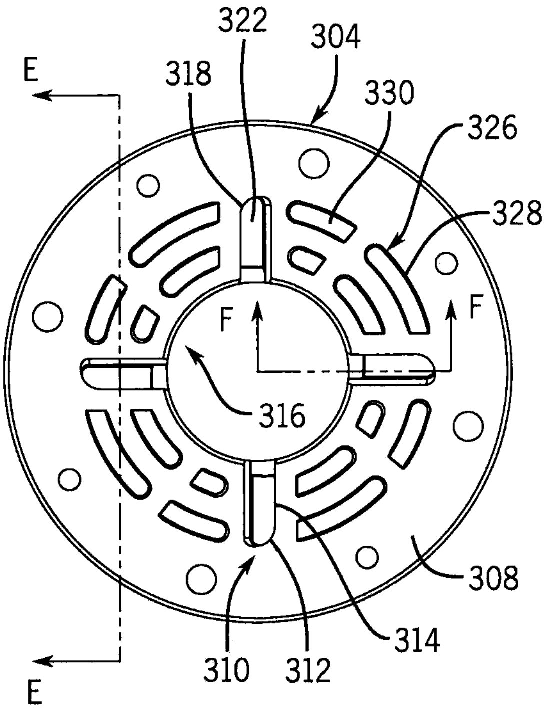
FIG. 27 is a front view of the cutting plate of FIG. 25.
Figure 28:
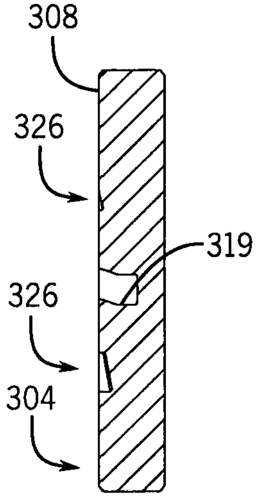
FIG. 28 is a cross section along line E-E of FIG. 27.
Figure 29:
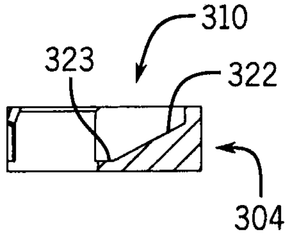
FIG. 29 is a partial cross section along line F-F of FIG. 27.
Figure 30:
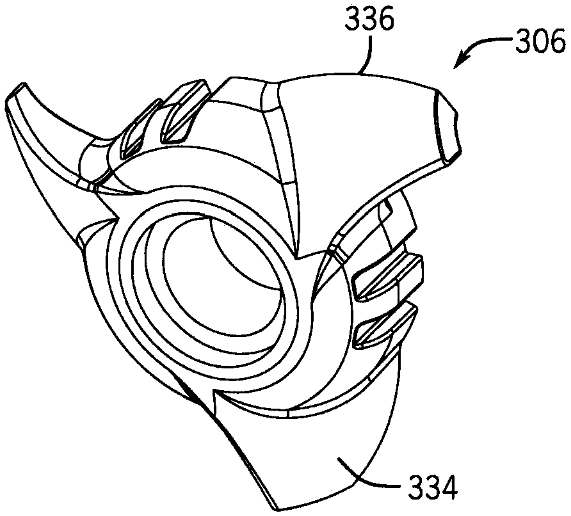
FIG. 30 is an isometric view of a cutting hub of the cutting blade assembly of FIG. 22.
Figure 31:
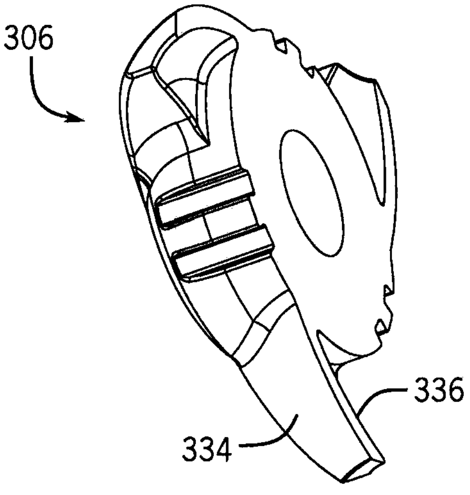
FIG. 31 is another isometric view of the cutting hub of FIG. 30.
Figure 32:
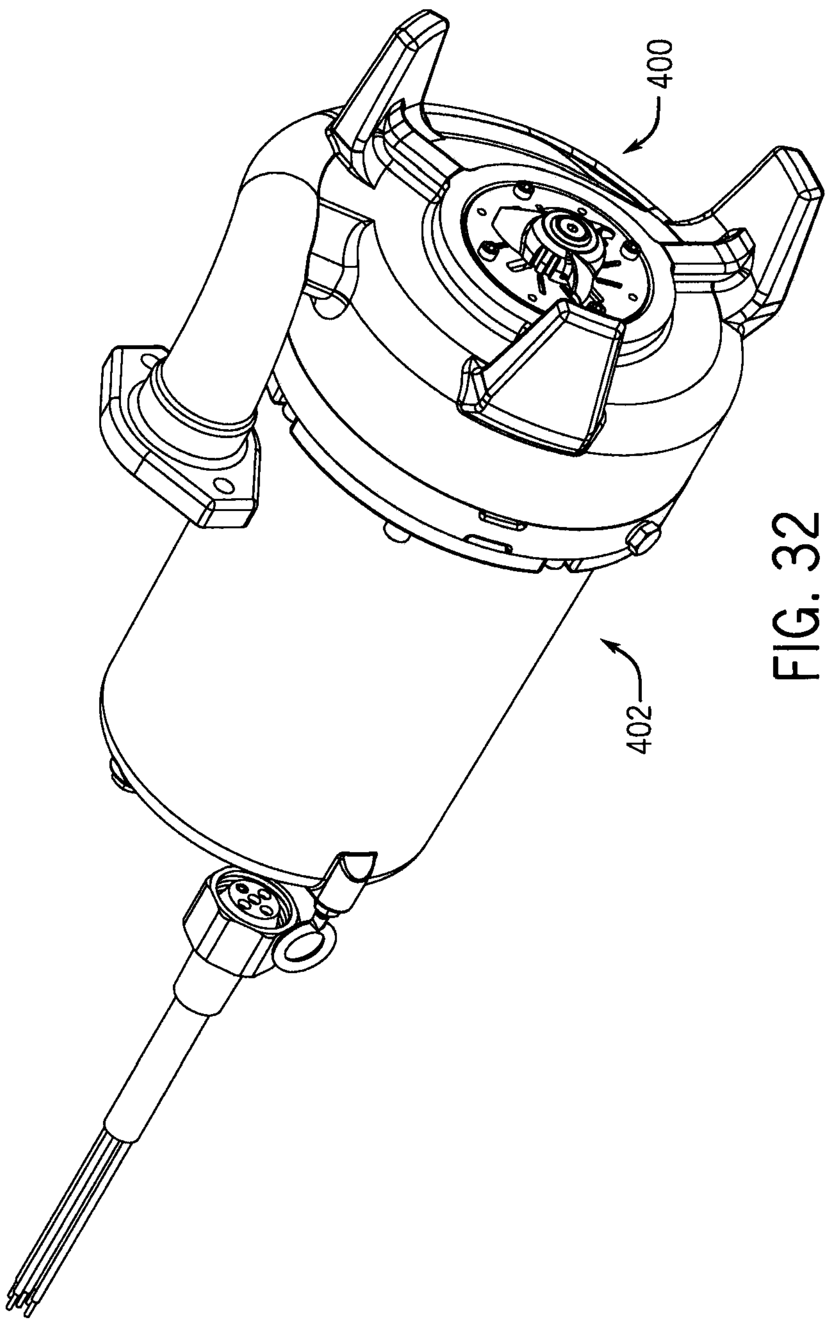
FIG. 32 is an isometric view of a cutting blade assembly according to a fourth embodiment of the invention for a grinder pump.
Figure 33:
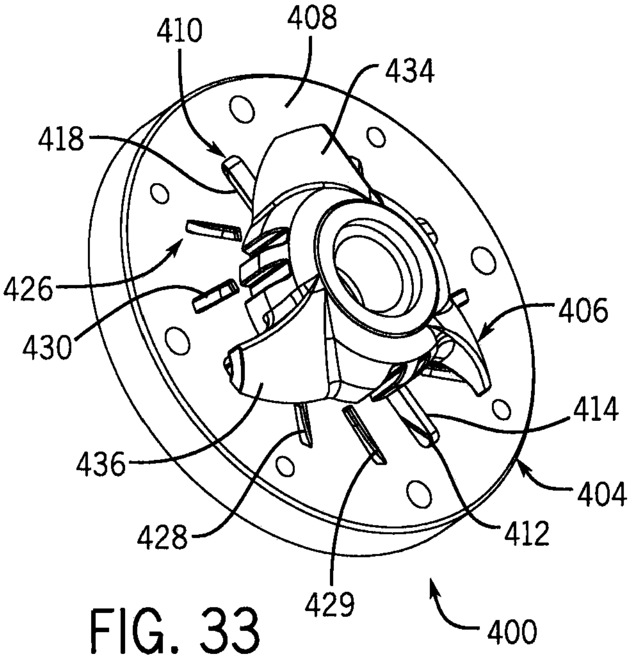
FIG. 33 is an isometric view of the cutting blade assembly of FIG. 32.

As shown in FIGS. 23-27, the cutting plate 304 is generally disk-shaped and has a circular axial face 308. A series of four orthogonal and circumferentially spaced cutting slots 310 are formed in the cutting plate 304. Each cutting slot 310 includes an arcuate end portion 312 and a radial portion 314. The end portion 312 and the radial portion 314 define an axial cutting edge 318 at the intersection of the cutting slot 310 and the axial face 308. With specific reference to FIG. 29, the cutting slot 310 includes a base surface 322 that is skewed axially inward from the axial face 308 toward a central opening 316 formed through the cutting plate 304. As shown in FIG. 29, the base surface 322 includes a landing portion 323 near the central opening 316 that is generally parallel with the axial face 308. The skewed arrangement of the base surface 322 helps direct slurry through the cutting slots 310 to the central opening 316. The cutting slot 310 is generally circumferentially angled or undercut (as shown in FIGS. 24, 27, and 28) to help maintain a sharp axial cutting edge 318, even as the axial face 308 wears during use. In addition, an inner portion 319 of the cutting slot 310 (shown in FIG. 28) is generally perpendicular to the axial face 308. A series of circumferential slots 326 of varying arc length are also formed in the axial face 308. These slots 326 are circumferentially spaced in two general rings about the central opening 316 and each defines a slot cutting edge 328 and a skewed slot base surface 330 that is angled axial inward from the axial face 308. In other embodiments, the shape, number, and relative orientation of the cutting slots 310 and circumferential slots 326 may be altered to accommodate application-specific requirements.

Figure 25:
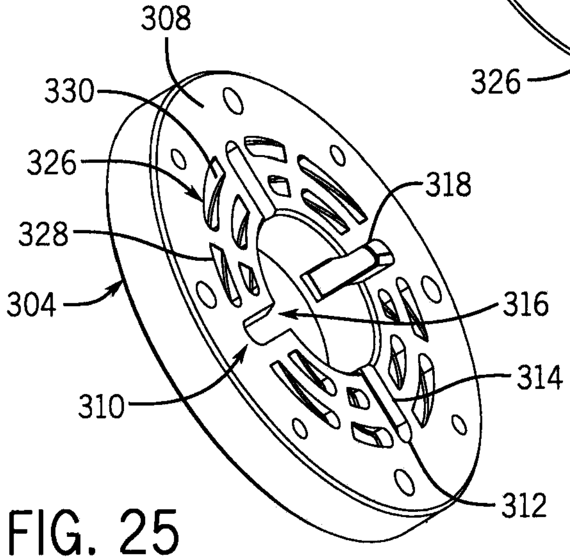
FIG. 25 is an isometric view of a cutting plate of the cutting blade assembly of FIG. 22.
Figure 26:
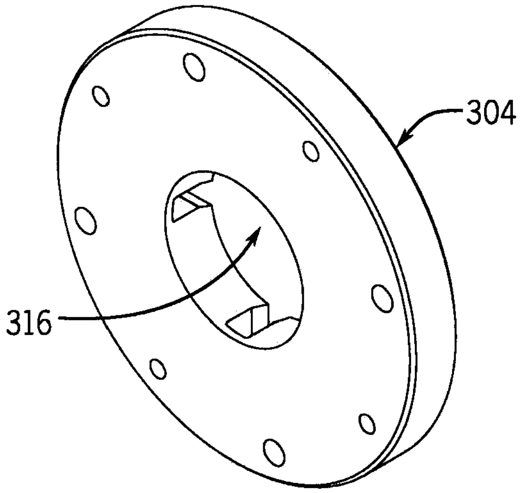
FIG. 26 is another isometric view of the cutting plate of FIG. 25.

As shown in FIGS. 24 and 25, the axial cutting action is generally accomplished as axial cutting arms 334 of the cutting hub 306 rotate adjacent to the axial cutting edge 318 and the slot cutting edge 328 in a scissor-type, shearing action. Specifically, the cutting hub 306 includes three circumferentially spaced axial cutting arms 334. Each of the axial cutting arms 334 of the cutting hub 306 has a leading edge 336 that is positioned adjacent to the axial face 308 of the cutting plate 304. As the cutting hub 306 rotates, the leading edges 336 of each axial cutting arm 334 shear past the axial cutting edge 318 and the slot cutting edge 328 to reduce debris to the desired size.

A fourth embodiment of a cutting blade assembly 400 having a multifaceted configuration is described with reference to FIGS. 32-41. The cutting blade assembly 400 and associated grinder pump 402 are similar to the cutting blade assembly 10 and grinder pump 12 described above, but focus on axial cutting. Therefore, the description of the cutting blade assembly 400 will emphasize the main differences from the preceding cutting blade assemblies 10, 200, 300.

FIGS. 33-41 illustrate the structure of and interaction between a cutting plate 404 and a cutting hub 406 of the cutting blade assembly 400. The cutting plate 404 and the cutting hub 406 are configured to primarily establish an axial cutting action during relative rotation between the cutting plate 404 and the cutting hub 406.

Figure 34:
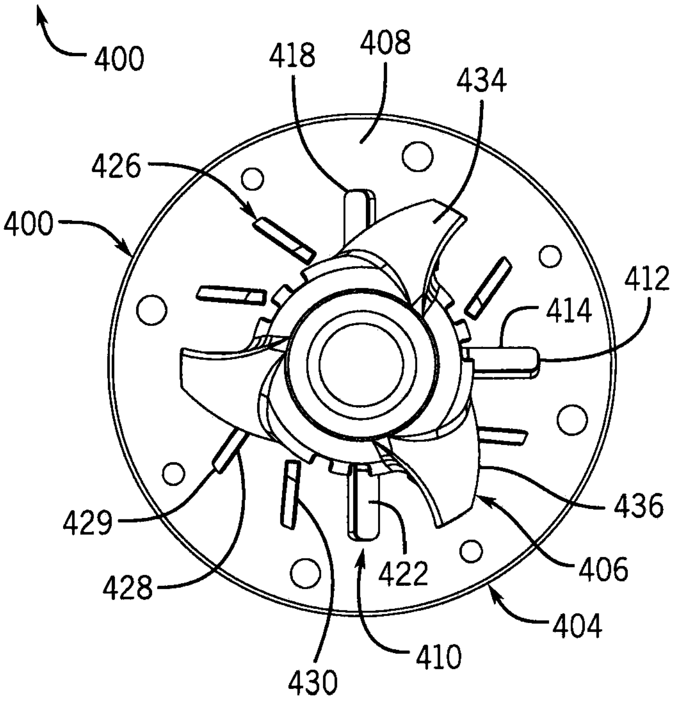
FIG. 34 is a front view of the cutting blade assembly of FIG. 32.
Figure 37:
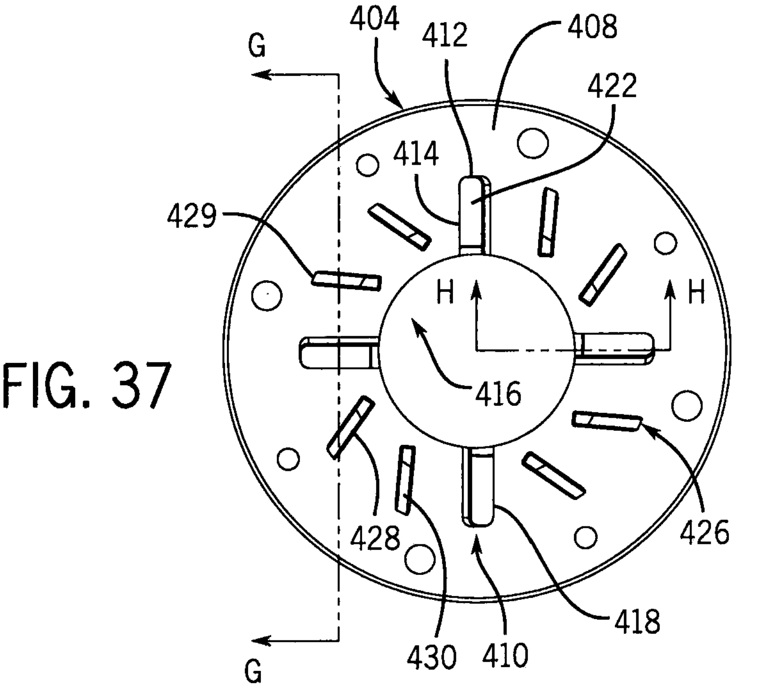
FIG. 37 is a front view of the cutting plate of FIG. 35.
Figure 38:
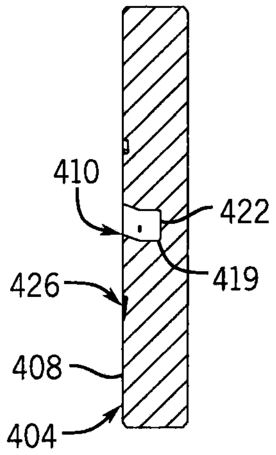
FIG. 38 is a cross section along line G-G of FIG. 27.
Figure 39:
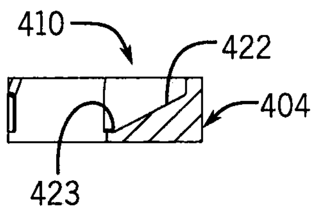
FIG. 39 is a partial cross section along line H-H of FIG. 27.
Figure 40:
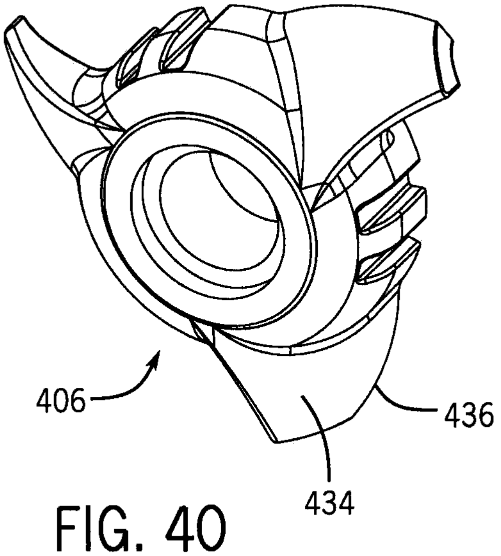
FIG. 40 is an isometric view of a cutting hub of the cutting blade assembly of FIG. 32.
Figure 41:
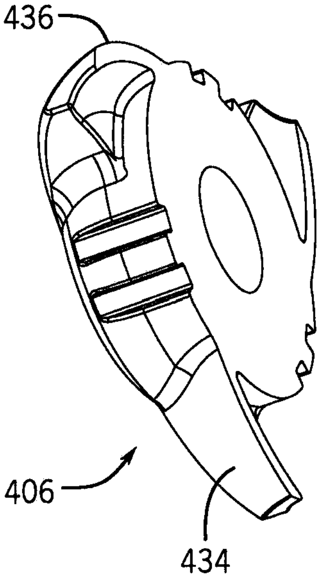
FIG. 41 is another isometric view of the cutting hub of FIG. 40.
Figure 42:
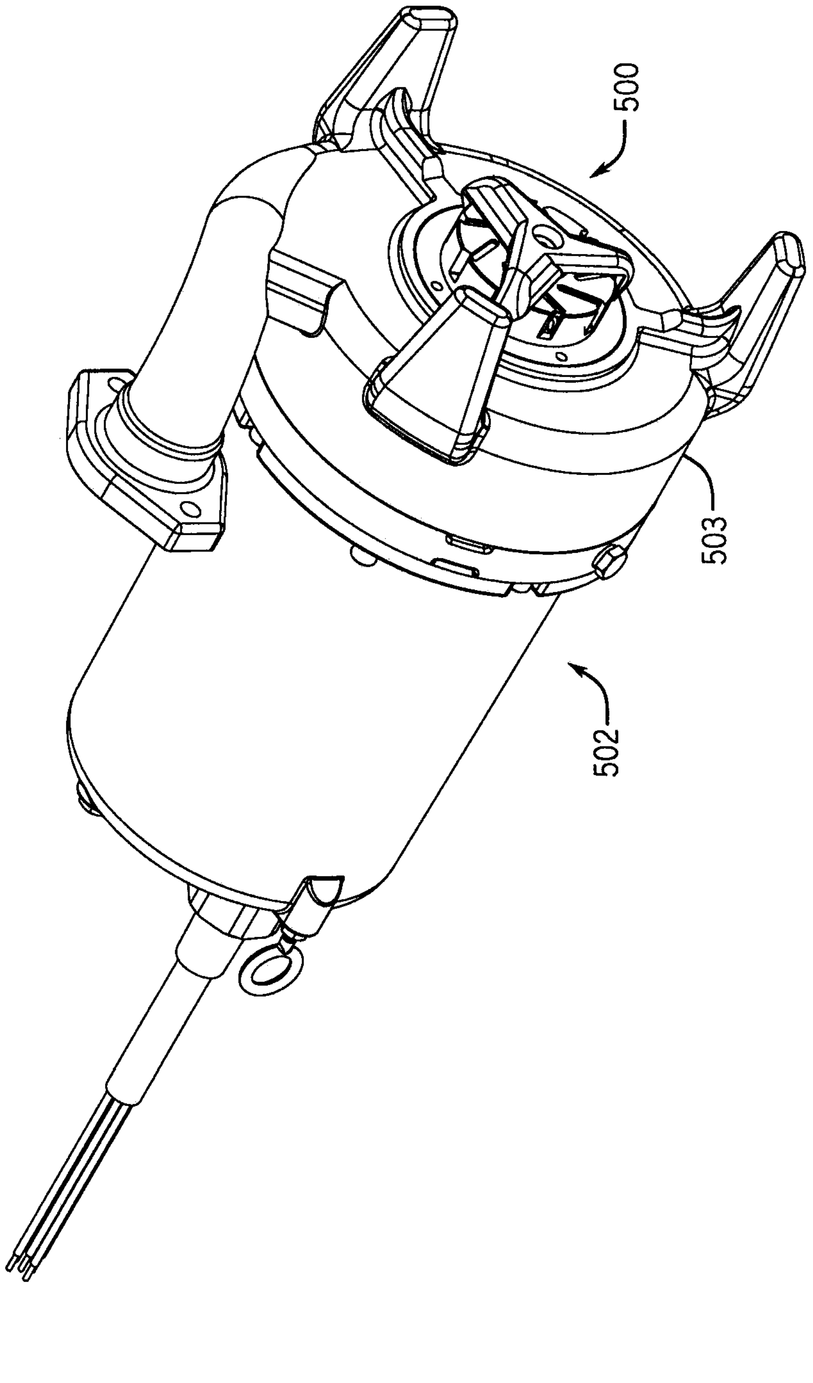
FIG. 42 is an isometric view of a cutting blade assembly according to a fifth embodiment of the invention for a grinder pump.
Figure 43:
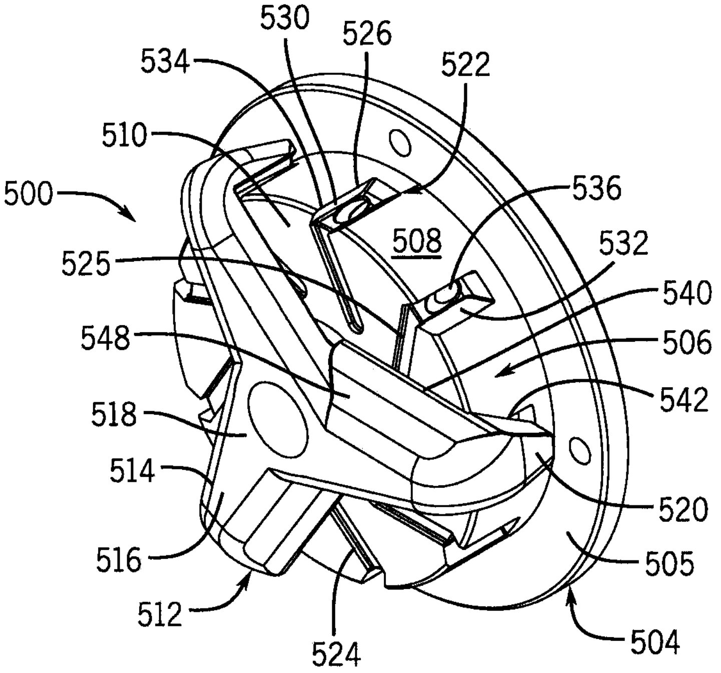
FIG. 43 is an isometric view of the cutting blade assembly of FIG. 42.

As shown in FIGS. 33-37, the cutting plate 404 is generally disk-shaped and has a circular axial face 408. A series of four orthogonal and circumferentially spaced cutting slots 410 are formed in the cutting plate 404. Each cutting slot 410 includes an arcuate end portion 412 and a radial portion 414. The end portion 412 and the radial portion 414 define an axial cutting edge 418 at the intersection of the cutting slot 410 and the axial face 408. With specific reference to FIG. 39, the cutting slot 410 includes a base surface 422 that is skewed axially inward from the axial face 408 toward a central opening 416 formed through the cutting plate 404. As shown in FIG. 39, the base surface 422 includes a landing portion 423 near the central opening 416 that is generally parallel with the axial face 408. The skewed arrangement of the base surface 422 helps direct slurry through the cutting slots 410 to the central opening 416. The cutting slot 410 is generally circumferentially angled or undercut (as shown in FIGS. 34, 37, and 38) to help maintain a sharp axial cutting edge 418, even as the axial face 408 wears during use. In addition, an inner portion 419 of the cutting slot 410 (shown in FIG. 38) is generally perpendicular to the axial face 408. A series of slots 426 of are also formed in the axial face 408. The slots 426 are oriented generally radially outward from the central opening 316 and are skewed relative to a ray extending from a central point of the cutting plate 404. In addition, each slot 426 defines a slot cutting edge 428, a distal edge 429 that is angled relative to parallel sides of the slot 426, and a skewed slot base surface 430 that is angled axial inward from the axial face 408. The slot base surface 430 is skewed inward from the axial face 408 as it extends from an outer portion toward the central opening 416 of the cutting plate 404. The configuration of the slots 426 helps prevent debris or slurry from becoming trapped or stagnant between the cutting hub 406 and the cutting plate 404, and each slot 426 defines a pocket (i.e., the slot 426 does not extend through the cutting plate 404). In other embodiments, the shape, number, and relative orientation of the cutting slots 410 and slots 426 may be altered to accommodate application-specific requirements.

Figure 35:
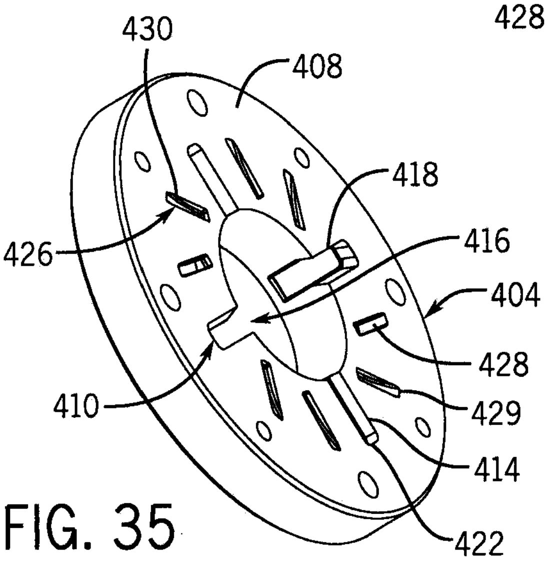
FIG. 35 is an isometric view of a cutting plate of the cutting blade assembly of FIG. 32.
Figure 36:
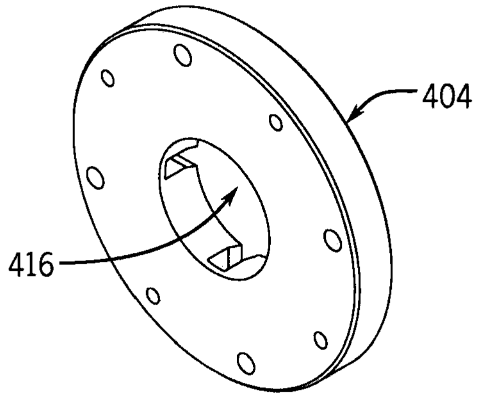
FIG. 36 is another isometric view of the cutting plate of FIG. 35.

As shown in FIGS. 34 and 35, the axial cutting action is generally accomplished as axial cutting arms 434 of the cutting hub 406 rotate adjacent to the axial cutting edge 418 and the slot cutting edge 428 in a scissor-type, shearing action. The scissor-type action establishes a zone of cutting engagement that progresses radially outward during relative rotation. Specifically, the cutting hub 406 includes three circumferentially spaced axial cutting arms 434. Each of the axial cutting arms 434 of the cutting hub 406 has a leading edge 436 that is positioned adjacent to the axial face 408 of the cutting plate 404. As the cutting hub 406 rotates, the leading edges 436 of each axial cutting arm 434 shear past the axial cutting edge 418 and the slot cutting edge 428 in a radially outward progression.

A fifth embodiment of a cutting blade assembly 500 having a bidirectional, multifaceted configuration is described with reference to FIGS. 42-47. The cutting blade assembly 500 and associated grinder pump 502 are similar to the cutting blade assembly 10 and grinder pump 12 described above. Therefore, the description of the cutting blade assembly 500 will discuss the main differences from the preceding cutting blade assemblies 10, 200, 300, 400.

The cutting blade assembly 500 includes a cutting plate 504 including an annular flange 505 that is coupleable to a pump housing 503. A cylindrical portion 506 of the cutting plate 504 includes an annular surface 508 and an axial surface 510. The cutting blade assembly 500 further includes a cutting hub 512 that includes three cutting arms 514 circumferentially spaced. Each cutting arm 514 includes an axial cutting portion 516 extending from a central hub 518 and a radial cutting portion 520 that extends generally orthogonally from the distal end of the axial cutting portion 516.

Figure 44:
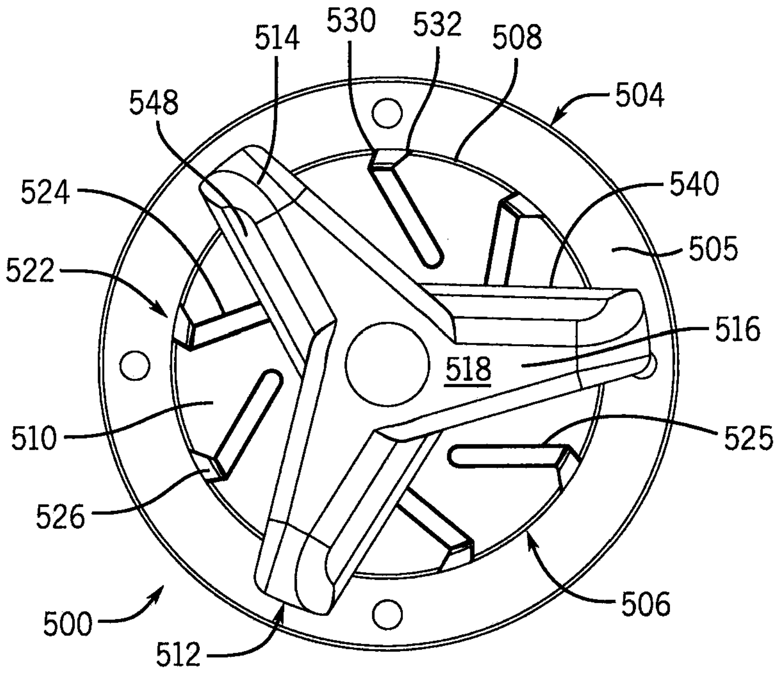
FIG. 44 is a front view of the cutting blade assembly of FIG. 42.
Figure 45:
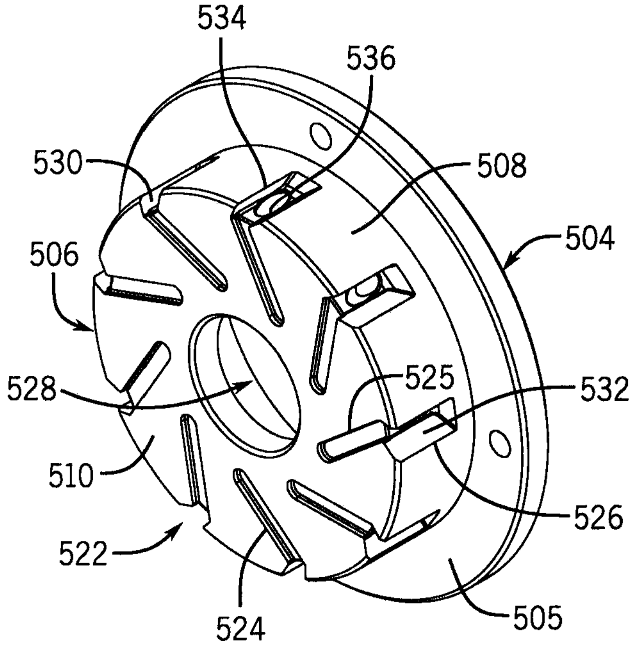
FIG. 45 is an isometric view of a cutting plate of the cutting blade assembly of FIG. 42.
Figure 46:
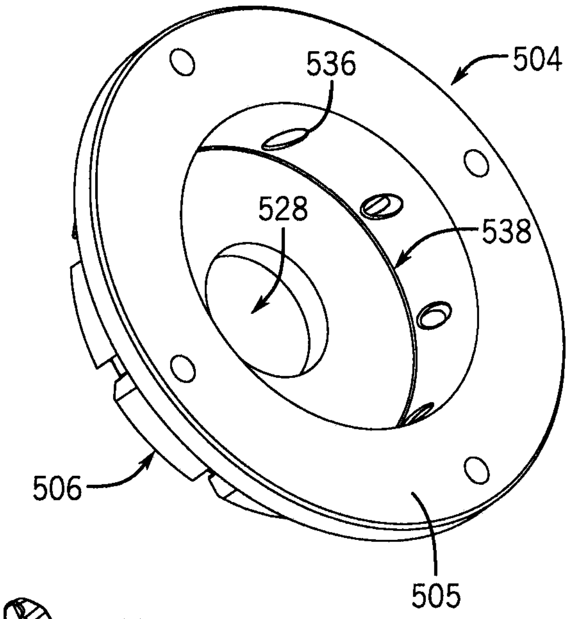
FIG. 46 is another isometric view of the cutting plate of FIG. 45.
Figure 47:
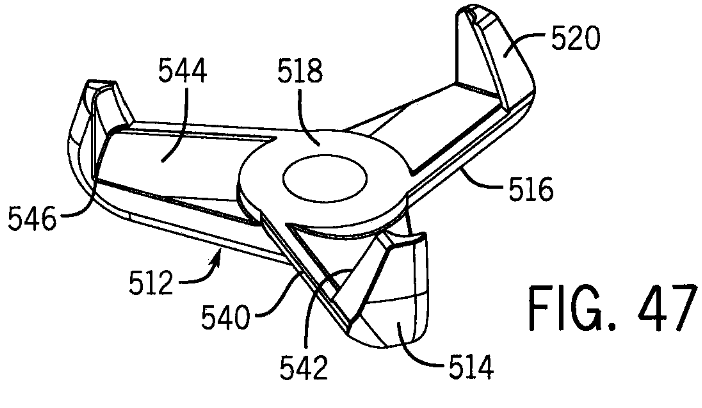
FIG. 47 is an isometric view of a cutting hub of the cutting blade assembly of FIG. 42.
Figure 48:
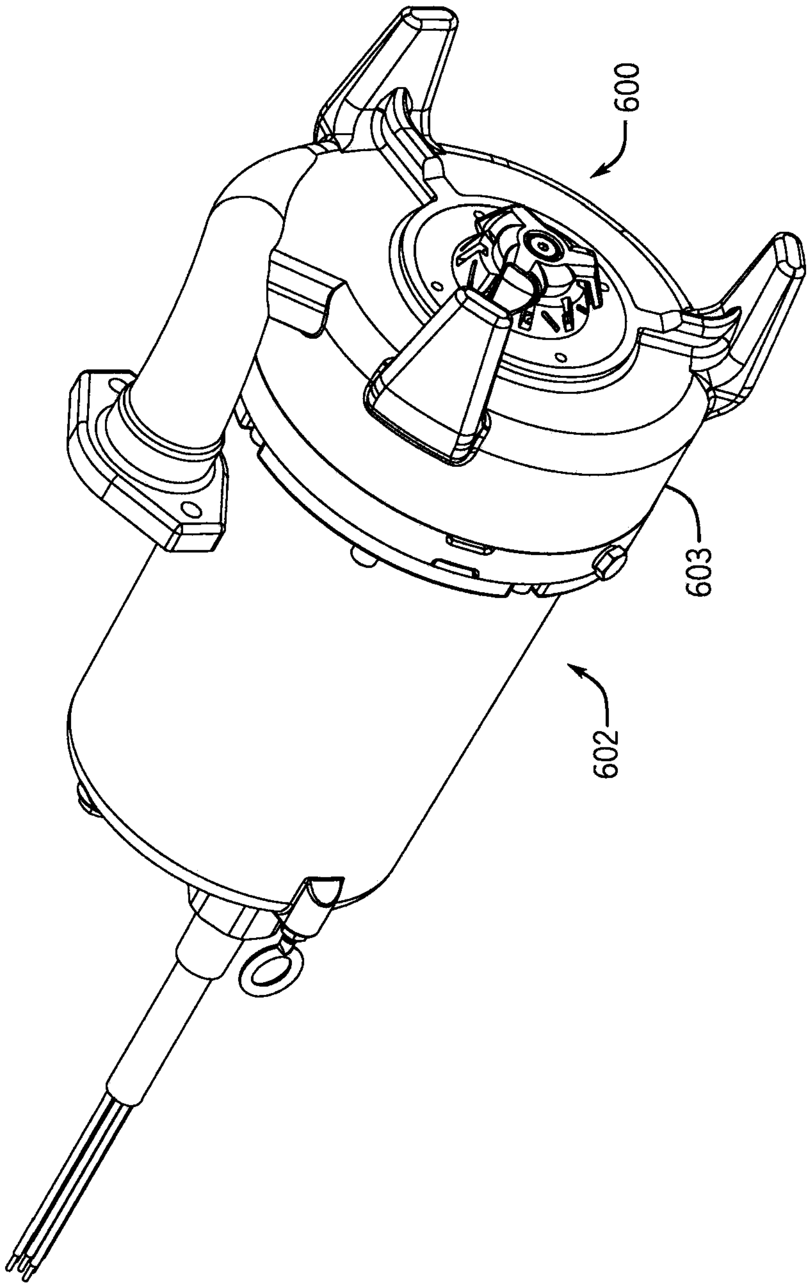
FIG. 48 is an isometric view of a cutting blade assembly according to a sixth embodiment of the invention for a grinder pump.

FIGS. 44 and 45 illustrate the structure of and interaction between the cutting plate 504 and the cutting hub 512 of the cutting blade assembly 500 that establishes both an axial cutting action and a radial cutting action. The cutting plate 504 includes a plurality of cutting slots 522 having an axial portion 524 formed in the axial surface 510 and a radial portion 526 formed in the annular surface 508 of the cutting plate 504. The axial portion 524 of each cutting slot 522 is oriented generally tangential to a central opening 528 formed in the cutting plate 504. The axial portion 524 of each cutting slot 522 defines an axial cutting edge 525 at the intersection with the axial surface 510. The recessed axial portion 524 intersects with the radial portion 526 proximate an outer perimeter of the cylindrical portion 506 of the cutting plate 504. Fluid, debris, and slurry within the axial portion 524 is directed outward along the axial portion 524 toward the radial portion 526. The radial portion 526 is oriented generally perpendicular to the annular flange 505 and includes skewed side walls 530, 532. One side wall 530 of the radial portion 526 defines a radial cutting edge 534 at the intersection with the annular surface 508. Openings 536 are formed in the radial portions 526 and extend through the cylindrical portion 506 of the cutting plate 504 and into a cavity 538 formed on the backside of the cutting plate 504. Thus, slurry sized according to the openings 536 flows through the cutting slots 522, through the openings 536, and into the cavity 538.

The cutting arms 514 of the cutting hub 512 define cutting edges that interact with the axial cutting edges 525 and radial cutting edges 534 of the cutting plate 504 to establish a scissor-type cutting action. Specifically, each cutting arm 514 defines an axial leading edge 540 along the axial cutting portion 516 and a radial leading edge 542 along the radial cutting portion 520. The axial leading edge 540 shears past the axial cutting edge 525 while the radial leading edge 542 shears past the radial cutting edge 534 to perform respective axial and radial cutting functions. The radial leading edge 542 is skewed relative to the side walls 530, 532 to further aid the scissor-type cutting action. The axial cutting portion 516 of each cutting arm 514 includes an angled or undercut backside 544. Similarly, the radial cutting portion 520 also includes an angled or undercut backside 546. Both backsides 544, 546 are configured to prevent debris from becoming trapped or clogged between the cutting arms 514 and the cutting plate 504. In addition, each cutting arm 514 defines a curved outer surface 548 to deflect debris and prevent clogging of the cutting blade assembly 500.

In other embodiments, the shape, number, and relative orientation of the cutting slots 522 and cutting arms 514 may be altered to accommodate application-specific requirements.

A sixth embodiment of a cutting blade assembly 600 incorporating a bidirectional, multifaceted configuration is described with reference to FIGS. 48-53. The cutting blade assembly 600 and associated grinder pump 602 are similar to the cutting blade assembly 10 and grinder pump 12 described above. Therefore, the description of the cutting blade assembly 600 will emphasize the main differences from the preceding cutting blade assemblies 10, 200, 300, 400, 500.

The cutting blade assembly 600 includes a cutting plate 604 including an annular flange 605 that is coupleable to a pump housing 603. A frustoconical portion 606 of the cutting plate 604 includes a generally conical surface 608 and an axial surface 610. The cutting blade assembly 600 further includes a cutting hub 612 that includes three cutting arms 614 circumferentially spaced. Each cutting arm 614 includes an axial cutting portion 616 extending from a central hub 618 and a radial cutting portion 620 that extends at an angle from the distal end of the axial cutting portion 616.

Figure 49:
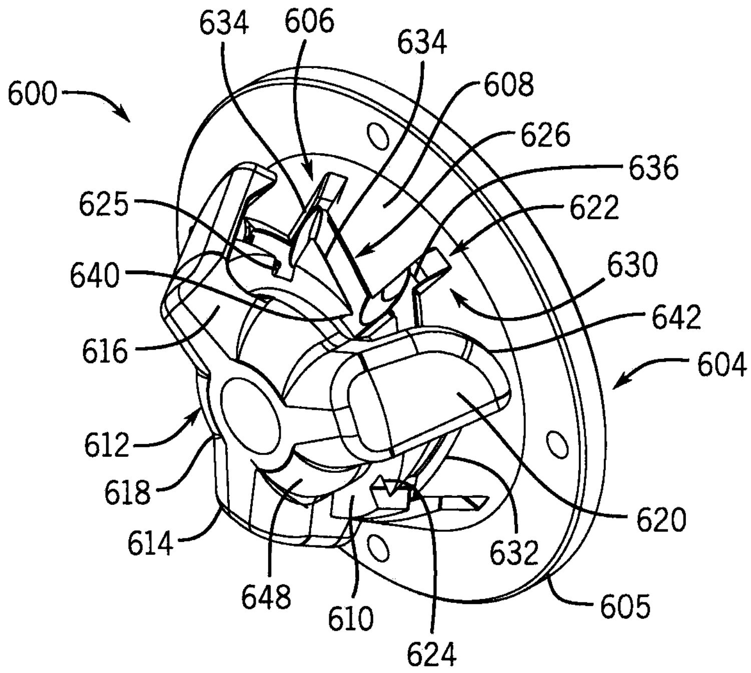
FIG. 49 is an isometric view of the cutting blade assembly of FIG. 48.
Figure 50:
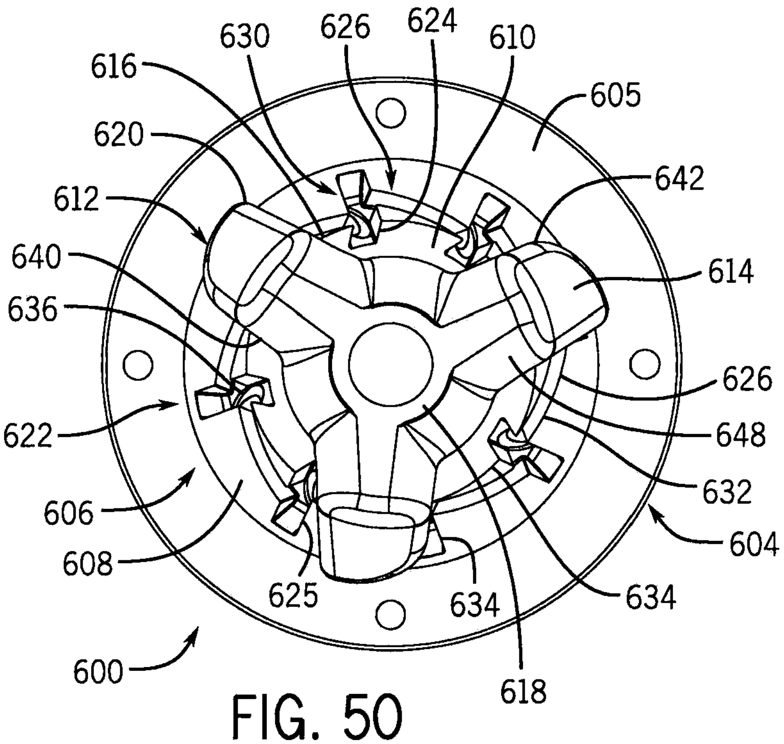
FIG. 50 is a front view of the cutting blade assembly of FIG. 48.
Figure 51:
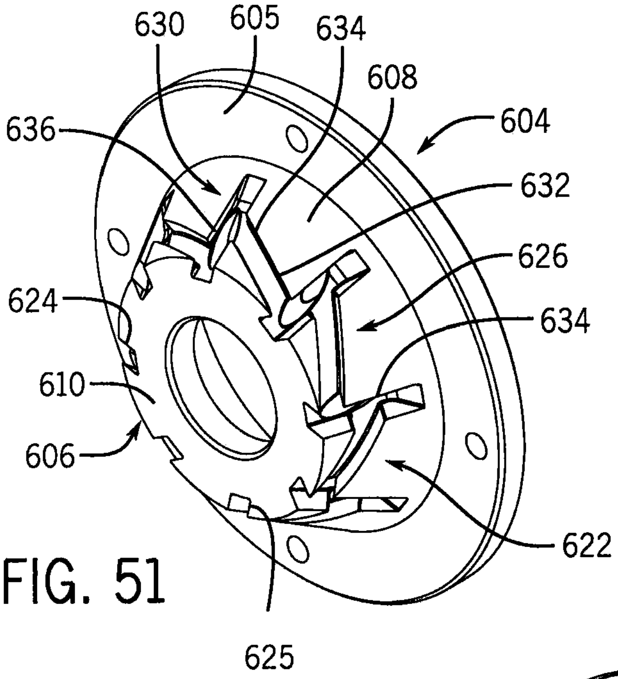
FIG. 51 is an isometric view of a cutting plate of the cutting blade assembly of FIG. 48.
Figure 52:
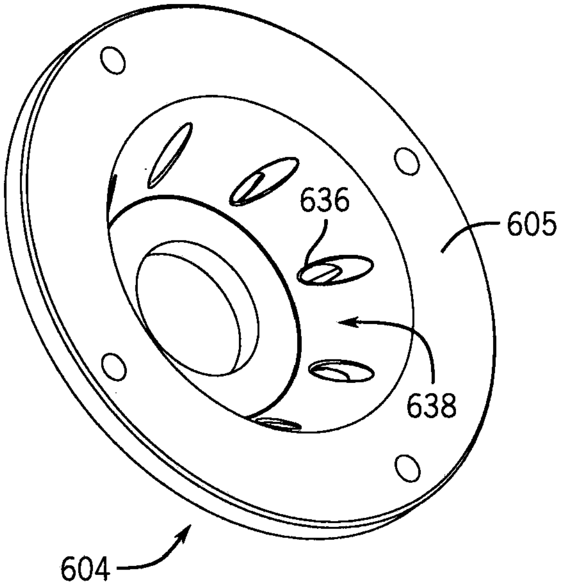
FIG. 52 is another isometric view of the cutting plate of FIG. 51.
Figure 53:
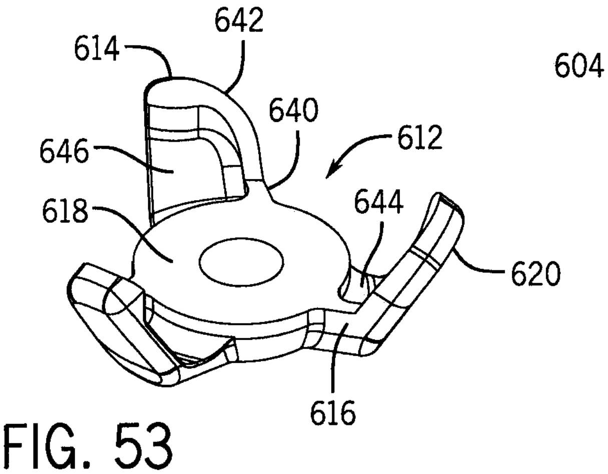
FIG. 53 is an isometric view of a cutting hub of the cutting blade assembly of FIG. 48.

FIGS. 49 and 50 illustrate the structure of and interaction between the cutting plate 604 and the cutting hub 612 of the cutting blade assembly 600 that establishes both an axial cutting action and a radial cutting action. The cutting plate 604 includes a continuous cutting slot 622 having repeating axial portions 624 formed through the axial surface 610 and radial portions 626 formed in the conical surface 608 of the cutting plate 604. The axial portion 624 of each cutting slot 622 defines an axial cutting edge 625 at the intersection with the axial surface 610. The radial portion 626 includes repeating slots 630 that are interconnected by slanted slots 632. Each slot 630 and interconnecting slanted slot 632 defines a cutting edge 634 at the intersection with the conical surface 608. Openings 636 are formed in the slots 630 and extend through the conical surface 608 of the cutting plate 604 and into a cavity 638 formed on the backside of the cutting plate 604. Thus, slurry sized according to the openings 636 flows through the cutting slot 622, through the openings 636, and into the cavity 638.

The cutting arms 614 of the cutting hub 612 define cutting edges that interact with the axial cutting edge 625 and cutting edge 634 of the cutting plate 604 to establish a scissor-type cutting action. Specifically, each cutting arm 614 defines an axial leading edge 640 along the axial cutting portion 616 and a radial leading edge 642 along the radial cutting portion 620. The axial leading edge 640 shears past the axial cutting edge 625 while the radial leading edge 642 shears past the cutting edge 634 of the repeating cutting slot 622 to perform respective axial and radial cutting functions. The axial cutting portion 616 of each cutting arm 614 includes an angled or undercut backside 644. Similarly, the radial cutting portion 620 also includes an angled or undercut backside 646. Both backsides 644, 646 are configured to prevent debris from becoming trapped or clogged between the cutting arms 614 and the cutting plate 604. In addition, each cutting arm 614 defines a curved outer surface 648 to deflect debris and prevent clogging of the cutting blade assembly 600 during operation.

In other embodiments, the shape, number, and relative orientation of the cutting slot 622 and cutting arms 614 may be altered to accommodate application-specific requirements.

It will be appreciated by those skilled in the art that while the invention has been described above in connection with particular embodiments and examples, the invention is not necessarily so limited, and that numerous other embodiments, examples, uses, modifications, and departures from the embodiments, examples, and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A cutting blade assembly comprising:

a cutting plate having an axial face, a radial face, and a central opening;

a plurality of cutting slots formed in the cutting plate and circumferentially spaced about the central opening, each of the plurality of cutting slots intersecting the axial face and defining a respective axial cutting edge at an intersection of each of the plurality of cutting slots and the axial face, wherein each of the plurality of cutting slots defines a base surface that is nonparallel to the axial face; and a cutting hub positioned in the central opening, the cutting hub having an axial cutting arm adjacent to the axial face and a radial cutting arm adjacent to the radial face.

2. The cutting blade assembly of claim 1, wherein each of the plurality of cutting slots defines a landing portion that is parallel to the axial face.

3. The cutting blade assembly of claim 1, wherein each of the plurality of cutting slots establishes fluid communication with the central opening.

4. The cutting blade assembly of claim 1, wherein the central opening defines the radial face, and each of the plurality of cutting slots intersects the radial face.

5. The cutting blade assembly of claim 1, wherein each of the plurality of cutting slots is oriented to extend radially outward from the central opening.

6. The cutting blade assembly of claim 1, wherein each of the plurality of cutting slots includes an undercut portion.

7. The cutting blade assembly of claim 6, wherein each of the plurality of cutting slots includes an inner portion that is perpendicular to the axial face and adjacent the undercut portion.

8. A cutting plate for a cutting blade assembly, the cutting plate comprising:

an axial face;

a central opening in the axial face;

a first cutting slot extending from the central opening and having a first axial cutting edge at an intersection of the first cutting slot and the axial face, wherein the first cutting slot defines a landing portion that is parallel to the axial face; and a second blind cutting slot extending partially into the axial face and having a second cutting edge, the second blind cutting slot being disconnected from the central opening, the second blind cutting slot defining a base surface that is nonparallel to the axial face.

9. The cutting plate of claim 8, wherein the base surface is skewed axially inward from the axial face toward the central opening.

10. The cutting plate of claim 8, wherein the second blind cutting slot includes two parallel sides and a distal edge that is angled relative to the parallel sides of the second blind cutting slot.

11. The cutting plate of claim 8, wherein the cutting plate is disk-shaped, the first cutting slot is oriented to extend radially outward from the central opening, and the first cutting slot is circumferentially angled with respect to the circumference of the cutting plate.

12. The cutting plate of claim 8, wherein the central opening has a center point, and the first cutting slot extends along a ray extending from the center point.

13. The cutting plate of claim 12, wherein the second blind cutting slot is oriented to extend radially outward from the central opening and is skewed relative to the ray.

14. The cutting plate of claim 8, wherein the first cutting slot defines a second base surface that is nonparallel to the axial face.

15. The cutting plate of claim 14, wherein the landing portion is adjacent the central opening.

16. A cutting plate for a cutting blade assembly in a pump, the cutting plate comprising:

an axial face;

a central opening in the axial face;

a first cutting slot having a first axial cutting edge at an intersection of the first cutting slot and the axial face, the first cutting slot configured to direct debris from the first axial cutting edge toward the central opening, wherein the first cutting slot defines a landing portion that is parallel to the axial face; and a second cutting slot having a second cutting edge, wherein the second cutting slot defines a pocket in the axial face of the cutting plate.

17. The cutting plate of claim 16, wherein the second cutting slot includes a skewed base surface.

18. The cutting plate of claim 16, wherein the first cutting slot further defines a base surface that is skewed axially inward from the axial face toward the central opening.

19. The cutting plate of claim 16, further comprising a plurality of the first cutting slots circumferentially spaced about the central opening.

20. The cutting plate of claim 16, further comprising a plurality of the second cutting slots circumferentially spaced about the central opening.

* * * * *